(12) United States Patent
Ryckman et al.

(10) Patent No.: US 11,275,031 B2
(45) Date of Patent: Mar. 15, 2022

(54) POROUS WAVEGUIDE SENSORS FEATURING HIGH CONFINEMENT FACTORS AND METHOD FOR MAKING THE SAME

(71) Applicant: CLEMSON UNIVERSITY, Clemson, SC (US)

(72) Inventors: Judson Ryckman, Clemson, SC (US); Gabriel Allen, Clemson, SC (US); William Frederick Delaney, Clemson, SC (US); Tahmid Talukdar, Clemson, SC (US)

(73) Assignee: Clemson University, Clemson, SC (US)

( * ) Notice: Subject to any disclaimer, the term of this patent is extended or adjusted under 35 U.S.C. 154(b) by 0 days.

(21) Appl. No.: 16/561,093

(22) Filed: Sep. 5, 2019

(65) Prior Publication Data

US 2020/0158650 A1 May 21, 2020

Related U.S. Application Data

(60) Provisional application No. 62/768,217, filed on Nov. 16, 2018, provisional application No. 62/803,745, filed on Feb. 11, 2019.

(51) Int. Cl.
*G01N 21/77* (2006.01)
*G02B 6/122* (2006.01)
(Continued)

(52) U.S. Cl.
CPC ....... *G01N 21/7746* (2013.01); *G02B 6/1225* (2013.01); *G02B 6/136* (2013.01);
(Continued)

(58) Field of Classification Search
CPC ........ G02B 6/1225; G02B 2006/12097; G02B 2006/12107; G02B 2006/12138; G01N 21/7746; G01N 2021/7726
See application file for complete search history.

(56) References Cited

U.S. PATENT DOCUMENTS

| 5,331,357 A | 7/1994 | Cooley et al. | |
| 7,521,769 B2 * | 4/2009 | Cunningham | G01N 21/00 257/414 |

(Continued)

FOREIGN PATENT DOCUMENTS

JP    2013120145 A  *  6/2013  ............... G01L 1/24

OTHER PUBLICATIONS

Ackert, et al. "Defect-mediated resonance shift of silicon-on-insulator racetrack resonators" *Opt. Expr.* 19(13) (2011) pp. 11969-11976.

(Continued)

*Primary Examiner* — Daniel Petkovsek
(74) *Attorney, Agent, or Firm* — Dority & Manning, P.A.

(57) ABSTRACT

Devices and methods of providing a high-performance optical sensor disclose a sensor comprised of a porous material designed to have a multilayer rib-type or multilayer pillar-type waveguide geometry. The resulting porous nanomaterial multilayer-rib or multilayer-pillar waveguide design is optically capable of achieving ~100% confinement factor while maintaining small mode area and single-mode character. Fabrication of the device is enabled by an inverse processing technique, wherein silicon wafers are first patterned and etched through well-established techniques, which allows porous nanomaterial synthesis (i.e., porous silicon anodization) either at the wafer-scale or at the chip-scale after wafer dicing. While ~100% is an optimal target, typical devices per presently disclosed subject matter may operate with ~98-99+%, while allowing for some (Continued)

design adjustments to be made if necessary, and still maintaining high sensitivity. i.e., >85-90% confinement suitable in some applications. In those instances, a primary benefit would still be use of the presently disclosed fabrication technology.

15 Claims, 14 Drawing Sheets

(51) Int. Cl.
G02B 6/136 (2006.01)
G02B 6/12 (2006.01)
(52) U.S. Cl.
CPC ........... G01N 2021/7779 (2013.01); G02B 2006/12061 (2013.01); G02B 2006/12097 (2013.01); G02B 2006/12107 (2013.01); G02B 2006/12138 (2013.01)

(56) References Cited

U.S. PATENT DOCUMENTS

| | | | |
|---|---|---|---|
| 8,349,617 B2 | 1/2013 | Weiss et al. | |
| 8,920,729 B2* | 12/2014 | Rong | G02B 6/1225 422/82.05 |
| 9,316,579 B2* | 4/2016 | Goddard | G01N 33/54373 |
| 9,348,099 B2 | 5/2016 | Krishnamurthi et al. | |
| 9,453,799 B2* | 9/2016 | Van Steenberge | G01N 21/7703 |
| 9,593,981 B2 | 3/2017 | Weiss et al. | |
| 9,709,734 B2 | 7/2017 | Krishnamurthi et al. | |
| 9,715,066 B2 | 7/2017 | Ryckman | |
| 9,889,504 B2 | 2/2018 | Weiss et al. | |
| 10,054,740 B2 | 8/2018 | Chetrit et al. | |
| 10,613,033 B2* | 4/2020 | Zhang | G02B 6/1225 |
| 10,732,093 B2* | 8/2020 | Hutter | G01N 21/65 |
| 2007/0059211 A1* | 3/2007 | Edmiston | G01N 21/05 422/82.11 |
| 2011/0059538 A1 | 3/2011 | Weiss et al. | |
| 2013/0057863 A1* | 3/2013 | Christiansen | G01N 21/0303 356/409 |
| 2013/0182249 A1 | 7/2013 | Weiss et al. | |
| 2014/0255653 A1 | 9/2014 | Weiss et al. | |
| 2016/0018610 A1 | 1/2016 | Krishnamurthi et al. | |
| 2016/0209589 A1 | 7/2016 | Krishnamurthi et al. | |
| 2017/0059469 A1* | 3/2017 | Hutter | G01N 33/497 |
| 2017/0184796 A1 | 6/2017 | Ryckman | |
| 2017/0336565 A1 | 11/2017 | Ryckman et al. | |
| 2018/0188453 A1 | 7/2018 | Chetrit et al. | |
| 2018/0202928 A1* | 7/2018 | Abdulhalim | G01N 21/774 |
| 2020/0240922 A1* | 7/2020 | King | G01N 21/7703 |

OTHER PUBLICATIONS

Álvarez, et al. "Birefringent porous silicon membranes for optical sensing" *Opt. Expr.* 19(27) (2011) pp. 26106-26116.
Arshavsky-Graham, et al. "Porous Silicon-Based Photonic Biosensors: Current Status and Emerging Applications" *Anal. Chem.* 91(1) (2019) pp. 441-467.
Azeredo, et al. "Direct Imprinting of Porous Silicon via Metal-Assisted Chemical Etching" *Adv. Funct. Mater.* 26(17) (2016) pp. 2929-2939.
Azuelos, et al. "Optimization of porous silicon waveguide design for micro-ring resonator sensing applications" *J. Opt.* 20(8):1085301 (2018) pp. 1-17.
Caroselli, et al. "Experimental study of the sensitivity of a porous silicon ring resonator sensor using continuous in-flow measurements" *Opt. Expr.* 25(25) (2017) pp. 31651-31659.
Chung, et al. "Plasmonic nanostructures for nano-scale bio-sensing" *Sensors* 11(11) (2011) pp. 10907-10929.

Dell'Olio, et al. "Optical sensing by optimized silicon slot waveguides" *Opt. Expr.* 15(8) (2007) pp. 4977-4993.
Evans, et al. "$TiO_2$ nanophotonic sensors for efficient integrated evanescent-Raman spectroscopy" *ACS Photon.* 3(9) (2016) pp. 1662-1669.
Hermanson, G.T. "Bioconjugate Techniques" *Academic Press* (1996).
Iqbal, et al. "Label-Free Biosensor Arrays Based on Silicon Ring Resonators and High-Speed Optical Scanning Instrumentation" *IEEE J. Sel. Top. Quantum Electron.* 16(3) (2010) pp. 654-661.
Ishikura, et al. "Dichroic rugate filters based on birefringent porous silicon" *Opt. Expr.* 16(20) (2008) pp. 1553-1559.
Jahani, et al. "Controlling evanescent waves using silicon photonic all-dielectric metamaterials for dense integration" *Nat. Commun.* 9(1):1893 (2018) pp. 1-9.
Jahani, et al. "Transparent subdiffraction optics: Nanoscale light confinement without metal" *Optica* 1(2) (2014) pp. 96-100.
Jane, et al. "Porous silicon biosensors on the advance" *Trends Biotechnol.* 27(4) (2009) pp. 230-239. (Abstract only).
Krauss, T.F. "Slow light in photonic crystal waveguides" *J. Phys. D Appl. Phys.* 40(9) (2007) pp. 2666-2670.
Krueger, et al. "Porous Silicon Gradient Refractive Index Micro-Optics" *Nano Lett.* 16(12) (2016) pp. 7402-7407.
Li, et al. "Characterization of sensing capability of optofluidic ring resonator biosensors" *Appl. Phys. Lett.* 97(1):011105 (2010).
Liang, et al. "Ultra-broadband dispersion engineering of nanophotonic waveguides" *Opt. Expr.* 24(26) (2016) pp. 29444-29451.
Lin, et al. "A porous silicon-based optical interferometric biosensor" *Science* 278(5339) (1997) pp. 840-843.
Mariani, et al. "Layer-by-layer biofunctionalization of nanostructured porous silicon for high-sensitivity and high-selectivity label-free affinity biosensing" *Nat. Commun.* 9(1):5256 (2018).
Milvich, et al. "Surface sensing with integrated optical waveguides: a design guideline" *Opt. Expr.* 26(16) (2018) pp. 19885-19906.
Orosco, et al. "Real-time monitoring of enzyme activity in a mesoporous silicon double layer" *Nat. Nanotechnol.* 4(4) (2009) pp. 255-258.
Ouyang, et al. "Quantitative analysis of the sensitivity of porous silicon optical biosensors" *Appl. Phys. Lett.* 88(16):163108 (2006) pp. 3-5.
Pacholski, et al. "Biosensing using porous silicon double layer interferometers: Reflective interferometric Fourier transform spectroscopy" *J. Am. Chem. Soc.* 127(33) (2005) pp. 11636-11645.
Robinson, et al. "First-principle derivation of gain in high-index-contrast waveguides" *Opt. Expr.* 16(21) (2008) pp. 16659-16669.
Rodrigo, et al. "Mid-infrared plasmonic biosensing with graphene" *Science* 349(6244) (2015) pp. 165-168.
Rodriguez, et al. "Photonic crystal nanobeam biosensors based on porous silicon" *Opt. Expr.* 27(7) (2019) pp. 9536-9549.
Rodriguez, et al. "Porous silicon ring resonator for compact, high sensitivity biosensing applications" *Opt. Expr.* 23(6) (2015) pp. 7111-7119.
Rong, et al. "Nanoscale porous silicon waveguide for label-free DNA sensing" *Biosens. Bioelectron.* 23(10) (2008) pp. 1572-1576.
Ryckman, et al. "Direct imprinting of porous substrates: A rapid and low-cost approach for patterning porous nanomaterials" *Nano Lett.* 11(5) (2011) pp. 1857-1862.
Sirbuly, et al. "Patterned microstructures of porous silicon by dry-removal soft lithography" *Adv. Mater.* 15(2) (2003) pp. 149-152.
Steinem, et al. "DNA hybridization-enhanced porous silicon corrosion: Mechanistic investigations and prospect for optical interferometric biosensing" *Tetrahedron* 60(49) (2004) pp. 11259-11267.
Talebifard, et al. "Optimized sensitivity of Silicon-on-Insulator (SOI) strip waveguide resonator sensor" *Biomed. Opt. Expr.* 8(2) (2017) pp. 500-511.
Testa, et al. "Liquid core ARROW waveguides: A promising photonic structure for integrated optofluidic microsensors" *Micromachines* 7(3):47 (2016) pp. 1-19.
Wan, et al. "Resonant Mode Engineering of Photonic Crystal Sensors Clad with Ultralow Refractive Index Porous Silicon Dioxide" *Adv. Opt. Mater.* 5(21):1700605 (2017).
Wang, et al. "Sensors and biosensors for the determination of small molecule biological toxins" *Sensors* 8(9) (2008) pp. 6045-6054.

(56) References Cited

OTHER PUBLICATIONS

Xu, et al. "Optical Refractive Index Sensors with Plasmonic and Photonic Structures: Promising and Inconvenient Truth" *Adv. Opt. Mater.* 7(9):1801433 (2019) pp. 1-47.
Yoshie, et al. "Optical microcavity: Sensing down to single molecules and atoms" *Sensors* 11(2) (2011) pp. 1972-1991.
Zhuo, et al. "Label-free biosensor imaging on photonic crystal surfaces" *Sensors* 15(9) (2015) pp. 21613-21635.

\* cited by examiner

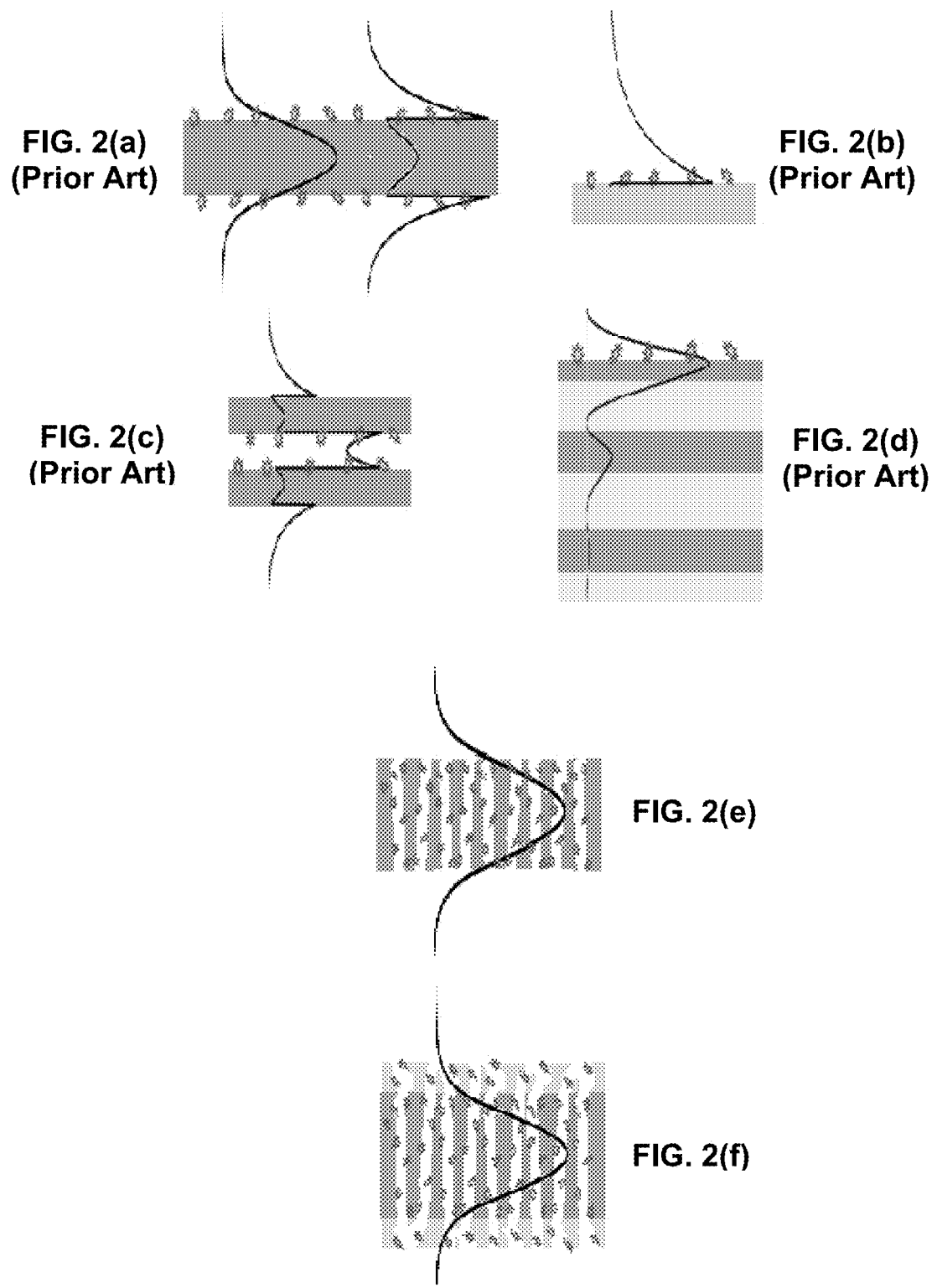

| Porous PhC Sketch | PhC Type | Confinement Factor | Index Contrast |
|---|---|---|---|
|  | Air hole | Low | High |
| 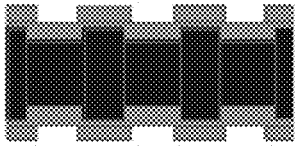 | Side wall grating | Highest | Low |
| 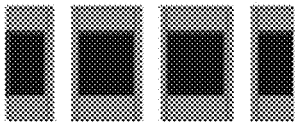 | Dielectric rod | Moderate-High | High-Moderate |
FIG. 4

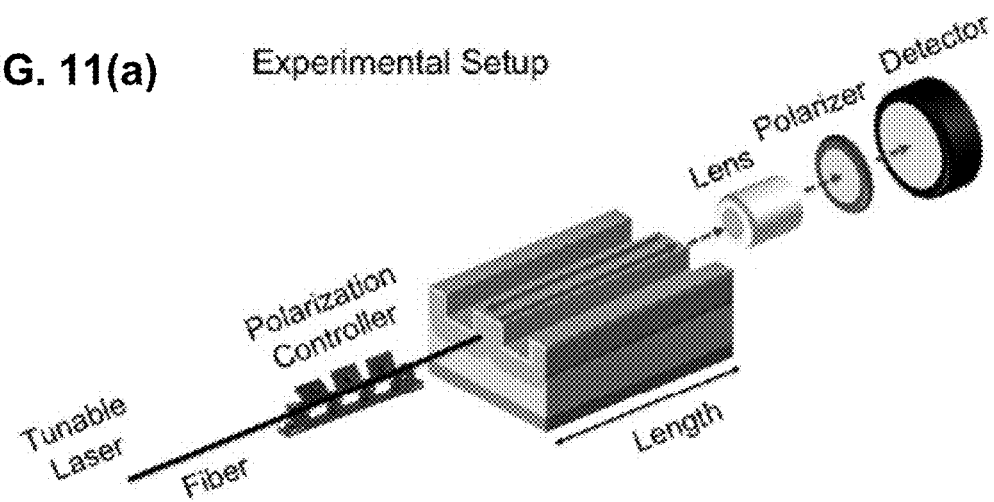
FIG. 11(a) Experimental Setup
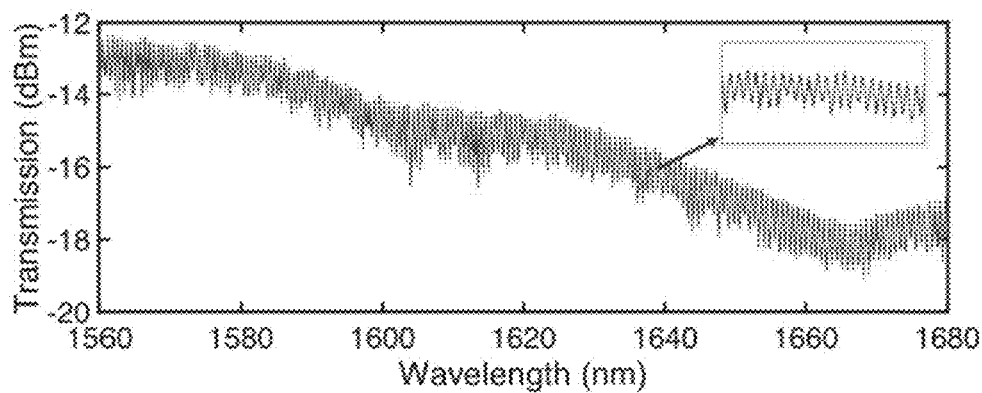
FIG. 11(b)
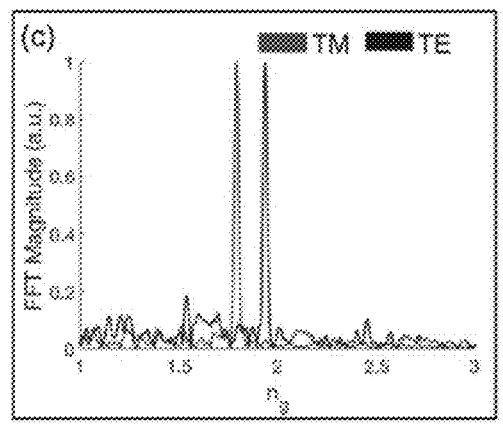
FIG. 11(c)

POROUS WAVEGUIDE SENSORS FEATURING HIGH CONFINEMENT FACTORS AND METHOD FOR MAKING THE SAME

PRIORITY CLAIMS

The present application claims the benefit of priority of U.S. Provisional Patent Application No. 62/768,217, titled "Multilayer Porous Waveguide Sensors Featuring High Confinement Factors and Method for Making the Same," filed Nov. 16, 2018, and of U.S. Provisional Patent Application No. 62/803,745, titled "Porous Waveguide Sensors Featuring High Confinement Factors and Method for Making the Same," filed Feb. 11, 2019, both of which are incorporated herein by reference for all purposes.

GOVERNMENT SUPPORT CLAUSE

This presently disclosed subject matter was made with government support under Grant/Contract No. EEC-1560070, awarded by National Science Foundation, and per National Science Foundation (NSF) Award 1825787. The government has certain rights in the presently disclosed subject matter.

FIELD

The present disclosure relates generally to biosensing, sensors, medical diagnostics, immunoassays, environmental monitoring, and nanotechnology subject matter. More particularly, the present subject matter relates to the design of high-performance optical sensors and methods for making the same.

BACKGROUND

Food- and water-borne toxins have a significant impact on public health and the economy. It is estimated that nearly 1 in 10 people in the world suffer illness due to contaminated food annually, with over 400,000 deaths each year linked to some form of food-borne illness. The effects of such exposures are especially threatening to children, the elderly, pregnant women, and those with underlying diseases. Long-term exposure to toxic agents, such as unsafe heavy metal concentrations in tap water, has been linked to increased risks of cancer, high blood pressure, heart and kidney disease, and reduced fertility. Food-borne toxins may originate from such pathways as synthesis by pathogens carried by food-sourcing animals or contamination transferred within the food supply chain (harvesting, packaging, shipping, preparation, and point-of-consumption).

While safe practices, responsible handling, and proper preparation are vital steps to ensuring food safety, the presence or absence of food contaminants can only be verified through analysis techniques employing sensor technologies. Water-borne toxins meanwhile, may be transferred through groundwater, chemical runoff, leaking or corroding pipes, contamination with untreated sewage, and ineffective water management and purification. As with food-borne toxins, safe water can only be verified using appropriate sensing technologies. Dramatic improvements to cost, sensitivity, selectivity, and response time have the potential to transform food safety and water quality sensors and advance new standards-of-practice for both first- and third-world nations alike.

While the ultra-sensitive and highly selective detection of pathogenic micro-organisms has matured dramatically from advancements in microbiology through methods such as quantitative polymerase chain reaction (qPCR), DNA/RNA genomic sequencing, and immunological assays, the highly sensitive and selective detection of toxins (i.e., toxic chemicals, heavy metals, etc.) remains a significant technological challenge. Although emerging biosensor platforms show promise for the detection of such toxins through their specific interactions with a functional surface, the small molecular or atomic size and limited charge of chemical toxins and heavy metal ions poses a fundamental challenge which limits their performance.

Integrated photonics and plasmonics offer the potential to achieve revolutionary device performance per unit cost—impacting such disciplines as data communications (i.e., $/Gbps/W) and medical diagnostics ($/limit of detection LOD)—owing to the dense integration of novel optical components featuring sub-wavelength dimensions. Biosensors constructed from such on-chip optical components are especially attractive as they can offer multiplexed detection, high sensitivity, fast response-time, and a low limit-of-detection (LOD). Despite recent progress in this area, the deeply sub-wavelength dimension of nanoscaled analytes and limited evanescent interaction with conventional optical platforms currently limits the sensitivity and LOD. In addition to these performance challenges, silicon photonic biosensors, for example, require the use of silicon-on-insulator substrates, which are an order of magnitude more expensive than bulk silicon.

Overcoming the sensitivity limitations of existing technology requires, to a large degree, optimizing the confinement factor, $f$, which describes the fraction of electric field energy density that is confined in the active sensing region. Silicon photonic confinement factors for example, are typically on the order of ~1% to ~5% within the active sensing region (when sensing surface adlayers on the order of ~nm in thickness). Prior art based on porous waveguides has proposed/demonstrated strip-waveguides with confinement factors <80%, and most commonly, 40-75%. Modifying prior art to approximately ~100% confinement factor is not straightforward as it results in increased risk of multimode optical characteristics and expanded mode size. Moreover, existing porous waveguides requires high resolution lithography and etching to be performed on porous film substrates. Such patterning requires delicate process optimization as resists and process chemicals are prone to infiltrate the porous network elevating the risk of pore clogging, corrosion, and/or contamination. On porous film substrates, it is also difficult to optimize photolithographic conditions (e.g., anti-reflection) and minimize the critical dimension with high yield, owing to variable optical interference induced by the multi-layer substrate.

Aside from the purely financial element, sensor costs are a critical technological factor as they imply a certain degree of accessibility to promote or hinder both device adoption and portability. While optical techniques have emerged as competitive alternatives to electrochemical and mass-sensitive biosensors, there is as yet no truly transformative improvement to R/$ over the standardized surface plasmon resonance (SPR) approach. For example, the ultra-high Q-factors of whispering gallery resonators offer extremely small limits-of-detection (LOD). However, their large modal volume and limited mode overlap results in low sensitivity and severe signal-to-noise limitations that prohibits their use outside of a controlled laboratory environment.

Conversely, while silicon photonics and related photonic platforms offer the promise of CMOS compatibility, high device density (offering multiplex detection), high device sensitivity, and potentially low cost, several factors prevent the improvements required for future implementation and mass adoption in food safety and water quality applications. Firstly, while the cost of CMOS processed silicon-on-insulator (SOI) substrates is economically viable for high speed transceiver applications, this does not translate to viability for single use and disposable sensor-chip applications. Most importantly, although optical sensors based on integrated photonics have demonstrated excellent bulk refractive index sensitivity, this performance neither translates into high levels of sensitivity for specific detection of surface interactions with nanoscaled analytes (e.g., small toxins, heavy metals, DNA, proteins, etc.) nor facilitates the specific and direct analysis of complex samples required in food safety applications.

Porous silicon (pSi) is known as an effective biosensing platform, capable of achieving a high sensitivity and low limit of detection (LOD) in a variety of optical configurations spanning thin-films, multilayers, and waveguides. Among these, waveguide platforms offer the prospect of achieving the smallest device size (highest density) combined with an ultra-sensitive and fast response owing to the shallow sub-surface dimension (<0.5 micron) of the core sensing region. However, existing pSi waveguides currently face several limitations.

First, optimizing sensitivity requires increasing the guided mode's confinement factor, f, within the active sensing region as high as possible, ideally to unity (100%). For 3D pSi strip waveguides with 2D cross-section, values in the range of f~40% to 75% are readily achievable (a large improvement compared to the f~1% of optimized silicon photonics waveguides); however, extending this confinement factor to 100% is fundamentally limited by the non-zero evanescent field of a standard strip waveguide and the transition from single-mode to multi-mode that arises with increasing waveguide size.

Secondly, the wafer-scale fabrication of pSi waveguides requires high resolution lithography and etching to be performed on porous silicon substrates. Such patterning requires delicate process optimization, as resists and process chemicals are prone to infiltrate the porous network elevating the risk of pore clogging, corrosion, and/or contamination. On porous silicon wafers it is also difficult to optimize photolithographic conditions (e.g., anti-reflection) and minimize the critical dimension with high yield, owing to variable optical interference induced by the multi-layer substrate.

As such, there is a continued need for the development of high-performance sensors, featuring improved optical interaction (higher sensitivity and lower LOD), and low cost.

SUMMARY

Aspects and advantages of embodiments of the present disclosure will be set forth in part in the following description, or may be learned from the description, or may be learned through practice of the embodiments.

In general, it is a present object to provide improved high-performance sensors, featuring improved optical interaction (higher sensitivity and lower LOD), and low cost.

It is a more particular object, in some instances, to provide an improved design and low-cost fabrication approach capable of ~100% confinement with an active sensing medium comprised of a porous nanomaterial.

It is another object, in some instances, to overcome key limitations of previously proposed porous waveguides.

Other object, in various instances, relate to providing improved subject matter relating to biosensing, sensors, medical diagnostics, immunoassays, environmental monitoring, and/or nanotechnology subject matter.

The presently disclosed subject matter relates to the design of high-performance optical sensors and methods for making the same.

Another more specific example, in some instances, proposes a sensor comprised of a porous material designed to have a multilayer rib-type waveguide geometry. Such example uniquely enables achievement of a near 100% (unity) confinement of light in the active sensing region, significantly higher than conventional integrated photonics where confinement may be on the order of ~1% with certain active sensing regions.

Other examples, in some instances, relate to a novel inverse processing technique which promotes reduced cost and complexity, while promoting improved critical dimensions and potential for higher device yield.

Presently disclosed subject matter encompasses an optical sensing approach capable of a transformative improvement to the toxin sensor's responsivity per unit cost [R/$]—where responsivity R encompasses the quantitative performance (sensitivity, limit of detection, specificity, and response time) and sensor cost is directly influenced by sensor complexity, labor costs, fabrication/packaging costs and probe equipment costs.

Presently disclosed subject matter relates in part to design, fabrication, and experimental demonstration of rib-type unity confinement factor waveguides comprised of mesoporous silicon. Waveguide fabrication is achieved through an inverse processing technique where silicon wafers are first pre-patterned at the wafer-scale prior to porous silicon anodization. Single-mode single-polarization waveguides featuring unity optical confinement factors are demonstrated. Sensor performance is characterized in a millimeter scale Fabry-Perot interferometer configuration, revealing a sensitivity >100× higher than conventional silicon photonic waveguides. Many other waveguide configurations may be utilized including but not limited to on-chip interferometers, ring resonators, waveguides for absorption spectroscopy, and the like.

Presently disclosed subject matter refers in part to two primary characteristics: (1) the optical design features a rib waveguide geometry with multiple layers (never before done with porous materials), and (2) the fabrication approach utilizes inverse processing, where silicon wafers are first patterned prior to porous material synthesis (prior art uses non-inverse processing).

Still other presently disclosed examples, in some instances, relate to a new porous nanomaterial waveguide design and fabrication protocol which addresses the aforementioned challenges. Here, a conventional strip waveguide is replaced with a multilayer-rib waveguide design. Optically this structure is capable of achieving ~100% confinement factor while maintaining small mode area and single-mode character. Fabrication of the device is enabled by a simple inverse processing technique, wherein silicon wafers are first patterned and etched through well-established techniques (offering the prospect of maximum yield and lowest cost). This approach further offers the flexibility to perform porous nanomaterial synthesis (i.e., porous silicon anodization) either at the wafer-scale or at the chip-scale after wafer dicing. Formation of the high- and low-index optical layers of presently disclosed subject matter is facilitated by the directional pore etching of presently disclosed <100> silicon substrates, which compares with other constructions of pSi micro-optical devices.

The presently disclosed toxin sensor addresses such challenges through interdisciplinary consideration across four key domains of photonic design, nanomaterials, fabrication, and surface chemistry. The presently disclosed photonic design and integration of porous nanomaterials with tailored surface chemistry can provide >100× enhancement to toxin sensitivity vs. state-of-the-art integrated photonics and SPR techniques, while the presently disclosed single-mode, single-polarization waveguide-based sensors can be realized through a presently disclosed inverse fabrication approach, thus offering operation as a visible wavelength integrated photonic platform with low costs.

In some instances, presently disclosed sensors can be used in conjunction with robust detection of heavy metals and other small toxins from water and food samples.

Accordingly, certain present objects include design of porous nanomaterial integrated photonics with unity confinement factors, using a presently disclosed photonic platform targeted to achieve maximum theoretical sensitivity to surface interactions. Other present objects relate to co-optimization of nanomaterial properties and presently disclosed photonic designs to map the design space for new classes of nanomaterial-enabled guided-wave resonators and passives.

Yet another present object involves realization of porous silica integrated photonics at visible wavelengths, including transitioning porous silicon integrated photonics at infrared wavelengths to porous silica integrated photonics at visible wavelengths.

Still another object relates to use of a presently disclosed low-cost "inverse fabrication" technique to realize high performance sensors from porous silica optical resonators and passives.

Other objects are that the presently disclosed subject matter will also generate significant broader impacts with regard to the promotion of societal well-being and public health through the advancement of optical biosensing with direct applicability to toxin detection required in food safety and water quality applications. The expected evolution of both sensor responsivity and cost from presently disclosed subject matter is expected to support >1000× improvement to responsivity per unit cost [R/$] compared to conventional integrated photonics. Such presently disclosed technologies have the potential to translate hours of laboratory sample analysis to mere seconds of in-field analysis, afford large sample volume and parallelized testing at low-cost, and open opportunities for cost effective point-of-preparation/consumption testing.

Other objects, as compared to existing silicon photonic sensors, that are presently disclosed sensors may provide up to 100× improvement to sensitivity and 10× improvement in cost.

Presently disclosed subject matter provides the design, fabrication, and characterization of a pSi waveguide which supports high surface adlayer sensitivity, near unity confinement factor, and attractive single-mode single-polarization character.

One exemplary embodiment of presently disclosed subject matter relates to a high-performance optical sensor, comprising a main body of support material, having at least one support surface; at least one waveguide feature formed in such support surface; and at least one layer of porous material supported on such waveguide feature, forming a waveguide geometry therewith.

In some instances, such at least one waveguide feature may comprise a plurality of such waveguide features. In other instances, such at least one waveguide feature (or a plurality thereof) may comprise one of a waveguide rib and one of a waveguide pillar oriented normal to such support surface.

Another exemplary embodiment of presently disclosed subject matter relates to a passive integrated photonic device, comprising a substrate of support material; and a plurality of porous nanomaterial layers formed in such support material, and having respectively differing porosity and effective refractive index surface.

It is to be understood that the presently disclosed subject matter equally relates to associated and/or corresponding methodologies. One exemplary such method relates to a simple inverse processing technique, where silicon wafers are pre-patterned prior to pSi anodization, and is presently disclosed as an effective route toward high performance low cost porous silicon photonics.

Another exemplary embodiment of presently disclosed subject matter relates to methodology for fabrication of a high-performance optical sensor, comprising providing a main body of support material, having at least one support surface; forming at least one waveguide feature formed in such support surface; and forming at least one layer of porous material supported on such waveguide feature, forming a waveguide geometry therewith.

In some instances, such at least one waveguide feature may comprise a plurality of such waveguide features. In other instances, such at least one waveguide feature (or a plurality thereof) may comprise one of a waveguide rib and one of a waveguide pillar oriented normal to such support surface.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which:

FIGS. 2(a) through 2(f) represent comparisons of electric field profiles and overlaps with surface bound biomarkers for conventional guided wave surface adlayer sensors (FIGS. 2(a) through 2(d)) vs. presently disclosed porous silica integrated photonic sensors (FIGS. 2(e) and 2(f));

FIG. 4 illustrates per present disclosure predicted trade-offs associated with different PhC types, with shaded regions indicating porous nanomaterial layers;

FIG. 7(a) shows the inverse fabrication procedure showing patterning of Si wafers followed by anodization to create 2-L or 3-L designs, while

FIG. 11(a) illustrates experimental setup of the Fabry-Perot configuration for testing the waveguides while FIG. 11(b) illustrates spectrum captured from the 1560-1680 nm wavelength sweep, and while FIG. 11(c) illustrates FFT analysis revealing peaks corresponding to the waveguide group index;

FIG. 12(a) illustrates a cross-section SEM of a 2-layer prototype pSi rib waveguide of 900 nm width while FIG. 12(b) illustrates a cross-section SEM of a 2-layer pSi rib waveguide of 500 nm width, and FIG. 12(c) illustrates a group index from the FFT of the spectrum for TE mode for the 900 nm waveguide, while FIG. 12(d) illustrates a group index from the FFT of the spectrum for TE mode for the 500 nm waveguide;

FIG. 13(a) illustrates the cross-section SEM of a 3-L pSi rib waveguide of 700 nm width and while FIG. 13(c) illustrates group index measured from FFT of the spectra for 700 nm waveguide while

Figure 1:
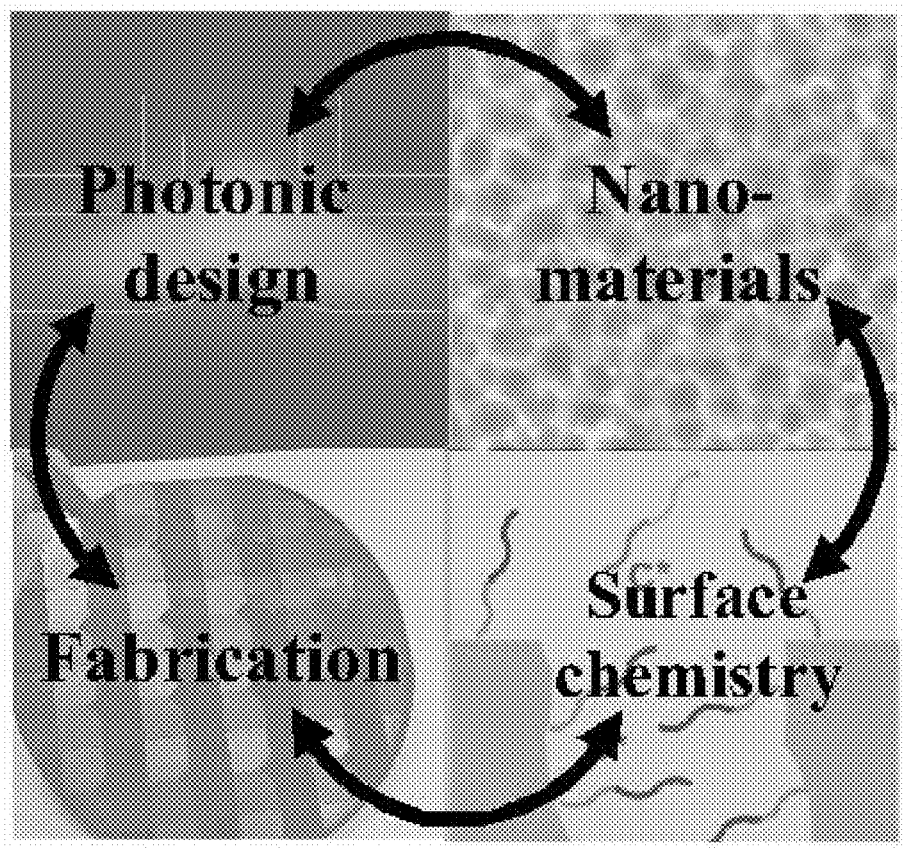
FIG. 1 represents multi-domain considerations towards presently disclosed food- and water-borne toxin biosensor subject matter.

Repeat use of reference characters in the present specification and drawings is intended to represent the same or analogous features or elements or steps of the presently disclosed subject matter.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Exemplary aspects of the present disclosure are directed to highly sensitive waveguide sensors.

Exemplary embodiments of presently disclosed subject matter relate in part to optical biosensors for the detection of toxins. The detection of toxins, particularly those comprised of low molecular weight molecules or heavy metal ions, is a significant technological challenge. Unlike pathogenic micro-organisms (i.e., bacteria, viruses, fungus, etc.), which are optically large and contain both known surface proteins enabling specific immobilization, as well as genetic signatures which can be purified, amplified, and effectively bar-coded for identification, small toxins are optically very small, have complex molecular interactions, and offer no direct means for barcoding or biological amplification. In order to meet the demand for ultra-sensitive, portable, and low-cost toxin sensors, addressing such fundamental challenges is of critical importance.

In general, there are two key components to an effective sensor: (1) a specific mechanism of interaction with the analyte, and (2) a transduction pathway which can convert the interaction into a measurable signal. Biosensors exploit surface interactions between an analyte and a chemically functionalized surface and offer attractive traits which foster detection. With the appropriate bioreceptor design, achieving a selective affinity to almost any heavy metal ion or small toxin is theoretically possible. For such purpose, and intended as non-limiting examples only, various presently disclosed embodiments make use of emergent DNA aptamer designs which have demonstrated specific surface interactions with heavy metal ions (i.e., $Hg^{2+}$) and small toxins (i.e., aflatoxin M1). See additional discussion herein regarding such aptamers.

After establishing an effective surface interaction with the analyte, the ability to detect the analyte in a given sample ultimately depends on the performance of the transduction pathway. The critical nature of the transducer and its sensitivity toward surface interactions has led to intense study in mass-sensitive, electrical, electrochemical, biomimetic, and optical sensors. Optical platforms are especially attractive as they offer the potential for low-cost, superior signal-to-noise, straight-forward readout, low power, label-free compatibility, and a wealth of unique optical phenomena.

In the optical domain, label-free detection of the target analyte is possible by measuring the optical response arising from the local perturbation in refractive index induced by the surface interaction with the analyte species (e.g., adsorption, desorption). In general, this refractive index perturbation may be complex, and as such, sensors are typically designed and optimized to operate on either: (1) the real part of the index, which facilitates guided wave and resonant detection through modification of the guided wave's effective index, $n_{eff}$, and the sensor's resonant wavelength $\lambda_0$; or (2) the imaginary part of the index which modifies the guided wave's absorption loss and may encompass strong spectral absorption peaks. Regardless of sensor type, maximizing the optical interaction and overlap with the analyte species to achieve maximum sensitivity is vitally important.

Presently disclosed subject matter provides a pathway toward ultra-high optical sensitivity to surface adlayer adsorption/desorption.

Presently disclosed subject matter centers around developing and applying a surface adlayer biosensor that achieves a greatly enhanced sensitivity as compared to current technology. The sensitivity of guided wave optical sensors is often defined in terms of resonance wavelength shift per refractive index unit as:

$$S_1 \equiv \frac{\delta\lambda}{\delta n_A} = \frac{\lambda_0}{n_{eff}} \Gamma \quad (1)$$

Here, $n_{eff}$ is the guided wave's effective index, $\Delta n_A$ is the change in refractive index in the active sensing region, and $\Gamma$ is the proportionality constant satisfying $\Delta n_{eff} = \Gamma \Delta n_A$. This proportionality constant may be derived via first-order perturbation theory as[16],[17]:

$$\Gamma \equiv \frac{n_g}{n_A} \frac{\int\int_A \varepsilon |E|^2 dxdy}{\int\int_\infty \varepsilon |E|^2 dxdy} = \frac{n_g}{n_A} f \quad (2)$$

Where $n_g$ is the group velocity of the guided wave, and f is the transverse "confinement factor" that describes the fraction of electric field energy density confined in the active sensing region of the device.

These equations make clear that maximizing sensitivity requires (1) maximizing the transverse "confinement factor" or modal overlap with the optical field and analyte species, (2) minimizing $n_{eff}$, and (3) maximizing the group index. It should be emphasized that items (1) and (2) are directly related to photonic design and material selection, and have enormous room for improvement, whereas item (3) motivates the well-established principles of slow-light waveguides which are principally applicable to any guided wave platform.

For the presently disclosed purposes, applicable to the detection of analyte surface interactions within an active sensing region, the sensitivity can be re-expressed and defined as the wavelength shift per adlayer thickness [units: nm/nm] or alternatively in terms of wavelength shift per adlayer mass surface density [units: $nm/(n_g/mm^2)$] as:

$$S_2 \equiv \frac{\delta\lambda}{\delta\sigma} = \frac{\delta\lambda}{\delta n_A} \frac{\delta n_A}{\delta\sigma} = S_1 \frac{\delta n_A}{\delta\sigma} \quad (3)$$

Here, we emphasize that maximizing sensitivity toward analyte surface attachment is a considerably more complex and challenging task as compared to maximizing sensitivity towards the bulk index changes of a liquid analyte. Maximum sensitivity in the context of bulk index sensing necessitates driving f toward unity by maximizing modal overlap in the cladding regions that are accessible to the liquid analyte, which is achieved by increasing the evanescent nature of the optical wave. From a modal confinement perspective both SPR-based and hollow core devices achieve record scale values for f that are close to unity.

FIGS. 2(a) through 2(f) represent comparisons of electric field profiles and overlap with surface bound biomarkers for conventional guided wave surface adlayer sensors (FIGS. 2(a) through 2(d)) vs. presently disclosed porous silica integrated photonic sensors (FIGS. 2(e) and 2(f)). In particular, FIG. 2(a) reflects TE/TM modes, FIG. 2(b) SPR, FIG. 2(c) slot mode, and FIG. 2(d) BSW. Those illustrations are to be compared versus presently disclosed examples FIG. 2(e) porous waveguide and FIG. 2(e) unity confinement factor porous waveguide.

For surface sensing, increasing the electric field intensity at the surface simultaneously increases the evanescent field strength and confinement factor within the inactive cladding region. In conventional guided wave surface adlayer sensors, a modus vivendi is reached between these criteria to create "optimal" confinement factors in the active (surface) sensing region. See FIGS. 2(a) through 2(d). For a molecular adlayer perturbation of 1 nm (roughly equivalent to a 10 nm adlayer at 10% surface coverage) the confinement factor is calculated to be on the order of ~1% for optimized single-mode TE/TM strip waveguides and ~5% for TE mode slot waveguides (with a 100 nm critical dimension). Such optimized silicon photonic designs produce a state-of-the-art sensitivity $S_2$~0.3 to 1.5 nm/nm. The porous silicon platform presently disclosed greatly surpasses that state-of-the-art sensitivity through a demonstrated $S_2$~46 nm/nm that is approximately two orders of magnitude larger than conventional silicon photonic waveguides.

In part, to achieve objectives described herein, consideration is given to presently disclosed porous nanomaterial integrated photonics with unity confinement factors. One consideration relates to designing maximum sensitivity into surface-based optical sensors motivated for the detection of small toxins. Per presently disclosed subject matter, with respect to regimes of interest to toxin sensing in food safety and water quality applications, it is possible to use porous nanomaterials in an integrated photonic platform to derive the maximum biosensor response.

An illustrative comparison is provided between conventional guided wave surface adlayer sensors (see FIGS. 2(a) through 2(d)) and the presently disclosed porous nanomaterial platform (see FIGS. 2(e) and 2(f)). Such guided wave platforms can serve as the basic elements in a wide variety of integrated photonic devices. These Figures visually depict and re-emphasize a key conclusion which follows from Equations 1-3, that maximizing sensitivity requires maximizing the transverse confinement factor and, correspondingly, the electric field overlap with the surface. As otherwise discussed herein regarding practical 3D devices, it is necessary to also maximize the longitudinal confinement factor. Although it is possible to design conventional optical platforms such as in FIGS. 2(a) through 2(d), to optimize their own "local" sensitivities by optimizing the evanescent portion of the electric field, this heavily constrained optimization does not represent optimization in the more "global" sense as sought per the presently disclosed subject matter. Indeed, while sensitivities to bulk index perturbation can be quite high, sensitivities for surface adlayer perturbation are severely limited in conventional platforms.

The presently disclosed introduction of a porous nanomaterial (FIGS. 2(e) and 2(f)) to provide an enormously enhanced surface area (~100 m2/cm3) removes a critical limitation of conventional optical platforms.

Porous nanomaterials, such as porous silicon (pSi), porous silica ($pSiO_2$), porous alumina ($pAl_2O_3$), nanoporous gold (npAu), are characterized by a large internal surface area and a host of unique and highly tunable properties. First, the average pore diameter, interpore spacing, and porosity may all be well controlled through careful selection of the starting material properties and synthesis process. For example, pSi can be fabricated in nanoporous, mesoporous, and macroporous regimes where the average pore diameter is <10 nm, <100 nm, or >100 nm respectively. A tunable porosity in the range from 35% to 80% in all of these regimes is independently achievable.

Second, the tunable porosity provides a powerful method for tuning effective material properties. In the optical domain, for pore dimensions significantly smaller than the operating wavelength, the refractive index can be described by effective medium theory. In pSi, for example, application of a Bruggeman effective medium across a porosity range from 35% to 80% produces a refractive index ranging from 2.6 to 1.3 at optical wavelengths. Partial or full oxidation and surface functionalization is then applied to further tailor the refractive index and realize an ultra-high surface area biosensor.

Direct conversion of a conventional waveguide sensor into a porous silicon waveguide sensor can dramatically improve the transverse confinement factor. In effect, the effective medium provided by the porous nanomaterial now becomes the active sensing region. For application to a conventional slab waveguide, such as represented by FIG. 2(e), confinement factors on the order of ~40% are immediately feasible while maintaining single mode character. Pushing the confinement factor to unity, however, requires a multi-mode waveguide or a multilayer waveguide. Prior waveguides have not yet addressed the design and optimization of practical 3D integrated photonic devices constructed from porous nanomaterials which feature 2D cross-section and can be densely arranged and routed on the surface of a chip.

The following gives consideration to presently disclosed photonic design space mapping, modal properties, and key parameters. Presently disclosed subject matter relates, in part, to a rib-type porous silicon waveguide amenable to achieving unity confinement factor and single-mode single-polarization character. It appears that such waveguide platform can offer the highest sensitivity of any integrated waveguide. A presently disclosed inverse fabrication approach is preferably used for fabrication of such a presently disclosed device. For example, briefly, low-cost all-silicon wafers are pre-patterned with the desired dimensions (for the in-plane index contrast) followed by multilayer porous silicon anodization (for the out-of-plane index contrast).

The presently disclosed multilayer pSi rib-waveguide offers simultaneous control and optimization of the confinement factor and modal properties. Unlike channel or strip waveguides where increasing confinement factor comes at the cost of increasing mode size and approaching multi-mode character, the presently disclosed rib-waveguide allows single-mode behavior to be guaranteed while preserving a high confinement factor and small mode area. The directional anodization of silicon makes possible the straightforward application of a multilayer design, thus preserving the remaining evanescent field in an active sensing region which would otherwise be lost in a conventional single core-layer waveguide. The preservation of this field permits, for the first time, the use of single-mode waveguides which achieve unity confinement factors with an active sensing medium.

One presently disclosed embodiment relates to a rib-type waveguide prototype in porous silicon at telecom wavelengths. These embodiments have a waveguide width ~0.75 microns, an etch depth ~0.5 microns, and layer porosities tuned to a refractive index of ~1.4 (layers 1 & 3) and ~2.1 (layer 2) after a short thermal oxidation (to enable $SiO_2$ surface functionalization). The average pore diameter is estimated to be ~70 nm for layers 1 and 3, and ~25 nm for layer 2. The calculated confinement factor f=99.05% is quite close to unity, under these conditions (see FIGS. 3(a) and 3(b)).

In this presently disclosed embodiment, the sensitivity becomes limited by the response of the effective medium, rather than the confinement factor which is saturated near unity. A simplified first-order Bruggemann effective medium model, considering the average pore size, pore-to-pore spacing, and porosity of the pSi layers has been utilized to calculate the $\delta n_A/\delta\sigma$ term in Equation 3. One can then embed this effective material response into the waveguide mode simulation to determine $\Delta n_{\mathit{eff}}$ (FIG. 3c), to predict a value for $\Delta n_{\mathit{eff}}/\delta\sigma \approx 0.047$ [RIU/nm] for the unity confinement factor porous waveguide, which corresponds to a record value sensitivity $\Delta\lambda/\delta\sigma \approx 37$ [nm/nm] more than two orders of magnitude higher than the value $\Delta\lambda/\delta\sigma \approx 0.3$ [nm/nm] which was otherwise recently established by S. Talebi-Fard et al. for optimized SOI technology. It was also greater than three orders of magnitude larger than sensitivity values established for whispering gallery resonators. Preliminary data experimentally determined the unity confinement factor pSi waveguide to exhibit a sensitivity of $\Delta\lambda/\delta\sigma \approx 46$ [nm/nm] which slightly outperformed the theoretical model. This data was collected by experimentally characterizing the porous silicon waveguide in a Fabry-Perot geometry (1560-1680 nm), before and after the attachment of a monolayer 0.8 nm thick silane adlayer (3-APTES).

Figure 3A:
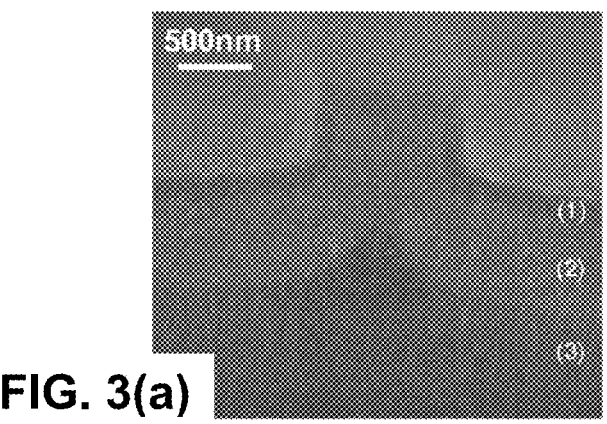
FIGS. 3(a) and 3(b) represent various aspects of a presently disclosed exemplary embodiment of a porous nanomaterial integrated waveguide with near unity confinement factor.
Figure 3B:
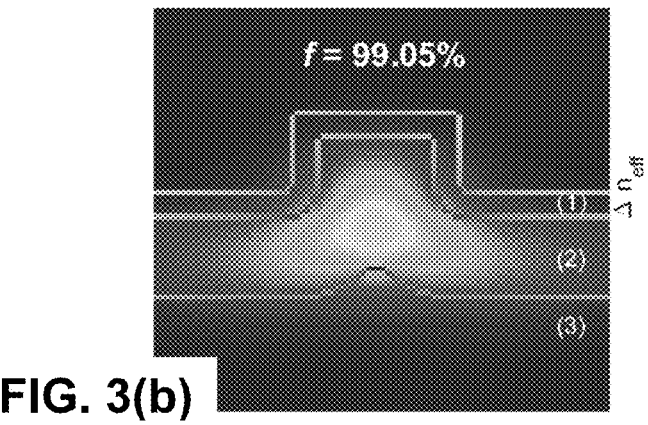

Thus, FIGS. 3(a) through 3(b) represent various aspects of presently disclosed exemplary embodiment of a porous nanomaterial integrated waveguide with near unity confinement factor. FIG. 3(a) illustrates a cross section SEM image of such exemplary embodiment three-layer porous silicon rib-type waveguide. FIG. 3(b) is a simulated Ex mode profile of such embodiment.

Successful device fabrication was verified by scanning electron microscopy (SEM), FIG. 3(a), which reveals the three pSi layers and unique dielectric profile which results from the intersection of opposing etch fronts. These dimensions are then incorporated into waveguide modal simulation (Lumerical MODE Solutions) to verify the near unity confinement factor—in this example, yielding a record value f~99.05%. Simulation further confirms the single-mode nature of the waveguide, as supported in the near-IR (~1600 nm). Unexpectedly, the waveguide is also found to exhibit single-polarization character, guiding only a fundamental TE polarized mode and no TM mode. This unique modal characteristic is attributed to the notch formed by the intersecting etch fronts and is highly desirable for compatibility with low-cost packaging and the ability to enable high signal-to-noise ratio in configurations with limited polarization control.

Surface adlayer sensitivity is characterized by measuring the optical response arising from silane attachment using a ~0.8 nm 3-APTES molecule. Measurements are performed in a Fabry-Perot interferometer configuration with a ~2.3 mm waveguide length between input and output facets. Transmission measurements are analyzed by the FFT method to extract the 2 nL value before and after attachment. The results reveal a change in the guided wave's $n_{eff}$ that is two orders of magnitude higher than recently optimized silicon photonic (SOI) surface adlayer sensors[1], resulting in a wavelength domain surface adlayer sensitivity $\Delta\lambda/\Delta\sigma\approx46$ [nm/nm] signficantly higher than the corresponding value achieved in SOI $\Delta\lambda/\Delta\sigma\approx0.3$ [nm/nm]. The experimentally measured value is in reasonable agreement with a simplified effective medium model, not accounting for effects associated with polarization or position dependence on the material effective index.

[1] S. TalebiFard, S. Schmidt, W. Shi, W. Wu, N. A. F. Jaeger, E. Kwok, D. M. Ratner, and L. Chrostowski, "Optimized sensitivity of Silicon-on-Insulator (SOI) strip waveguide resonator sensor," Biomed. Opt. Express 8, 2 (2017).

The presently disclosed exemplary embodiment waveguide has demonstrated a remarkable level of surface sensitivity despite the lack of a systematic design optimization. Considering the effective medium response, $\delta n_A/\delta\sigma$, it is noted that it is strongly dependent upon the porous morphology separately from the modal characteristics.

Both naïve and rigorous effective medium models may be used to model the effective medium response. With such an approach, considering the approximately tubular morphology of porous silicon, one can map out the influence that key parameters such as pore size, pore spacing, and porosity have on sensitivity. One may also consider alternative morphologies (branchy, interconnected, etc.) and evaluate the impact that specific surface area ($m^2/cm^3$) has on the effective medium's surface sensitivity. In general, per present disclosure, optimized detection toward different toxins/aptamers and/or more generally nanoscaled analytes, require different porous morphologies, e.g., optimized detection of a 2 nm length analyte will require a different average pore size than a 20 nm dissociative aptamer. Per present disclosure, such analysis may consider optimization toward various analyte size regimes to provide both important design guidelines and to establish theoretical performance trade-offs to be further considered by a given user in practice of the presently disclosed subject matter.

In addition to identifying the optimal nanomaterial morphology, which yields a maximum surface sensitivity for a given analyte, the presently referenced technology will also make it possible to identify the limits of currently available nanomaterials and could motivate future work where key nanomaterial parameters (i.e., pore size, shape, surface area, etc.) are pushed beyond current limits.

The record level surface sensitivity of the unity confinement factor porous waveguide is expected to translate into record level surface sensitivity for 3D integrated photonic devices, such as on chip passives and resonators.

With respect to resonators, in many integrated devices, the waveguide dielectric profile is modified as a function of distance along the optical axis. One example of such a device is the Bragg reflector or 1D photonic crystal (PhC) which can be utilized to make filters and resonant cavities. A commonly utilized design approach, which yields a large bandgap for TE polarization, is the use of an "air hole" PhC. Such air hole PhCs have been employed in SOI technology for the development of high Q/V optical biosensors, and for other applications such as non-linear optics, quantum electrodynamics, and optomechanics. While converting such a PhC unit cell directly into a porous effective medium would dramatically increase confinement factor, the 3D nature of the air holes forces a significant fraction of the field to remain evanescent. In effect, it is not possible to achieve a net unity confinement factor within the porous medium using an air hole unit cell. In a 3D device, both the transverse and longitudinal confinement factors must equal unity (i.e., everywhere along the entire optical axis) for the net confinement factor to also equal unity.

As illustrated in FIG. 4, alternate unit cell geometries are expected to have various characteristics based on (1) side wall gratings (SWG), and (2) dielectric rods formed by lateral slots. Presently disclosed technology expects that the SWG type structure will enable unity confinement factor PhC cavity biosensors to be realized for the first time. This is enabled in part by the presently disclosed multi-layer fabrication approach, which harvests both the core and evanescent field for sensing. The trade-off of the SWG device will be a significantly reduced index contrast, requiring longer devices to achieve the same Q-factor. As an alternate platform which could address this trade-off, consideration can be given to the dielectric rod unit cell. Here, the 3D confinement factor will be limited only by the minimum lateral slot width (critical dimension, CD) that can be fabricated. In this PhC type, a large index contrast and near unity confinement factor can potentially be provided in the limit of a narrow achievable CD.

In addition to considering the design of PhC resonators with ultra-high surface sensitivity, one can also consider selected passive structures per presently disclosed subject matter. Two key structures of particular interest are the (1) grating coupler and (2) directional coupler.

The grating coupler is of particular interest for two primary reasons. First, it can facilitate the efficient chip-scale and wafer-scale testing of integrated photonic devices without requiring edge facet preparation and coupling. Second, it can provide an alternative, diffraction based, method of sensor operation. For the PhC resonator, sensor measurement requires wavelength interrogation. However, in some low-cost sensing applications it may be desirable to simply achieve a binary "Yes" or "No" detection response or a quantitative response which does not require a spectrometer. The large surface sensitivity of the presently disclosed platform means that devices operating under such principles are achievable.

A waveguide grating designed to operate as a low NA, weak diffraction grating can operate as a sensor. Here, the emission angle and diffraction efficiency are both strong functions of the effective index of the waveguide. This device will therefore allow sensor measurement to be directly performed in the far-field, without requiring any wavelength interrogation. The design in this case is relatively straightforward, and would require a modest design of experiments (DOE) which analyzes the diffraction efficiency (grating strength) and emission angle, as functions of grating design, index contrast, and confinement factor. The majority of these calculations are amenable to analytical consideration, considering the device will operate in a small grating approximation. Remarkably, from initial calculations an emission angle surface sensitivity on the order of $\Delta\theta/\delta\sigma \sim 2.5$ deg/nm utilizing the presently disclosed porous waveguide grating is expected, resulting in a beam tilt more than two orders of magnitude larger than what is possible in evanescent SOI technology (see FIGS. 5(a) and 5(b)). This opens up new regimes of single-wavelength sensor operation in low-cost and high sensitivity integrated photonic form factors, per presently disclosed subject matter. Therefore, the high confinement factor waveguide may be interrogated or adapted in various ways, all of which benefit from the high confinement factor.

Figure 5A:
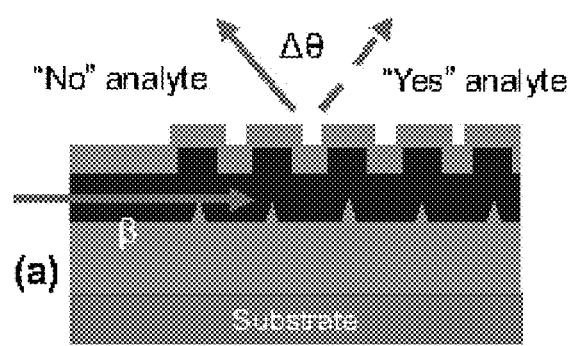
FIGS. 5(a) through 5(d) illustrate exemplary embodiments of various passive devices which can enable record surface sensitivity in non-wavelength interrogated (single-wavelength) configurations.
Figure 5B:
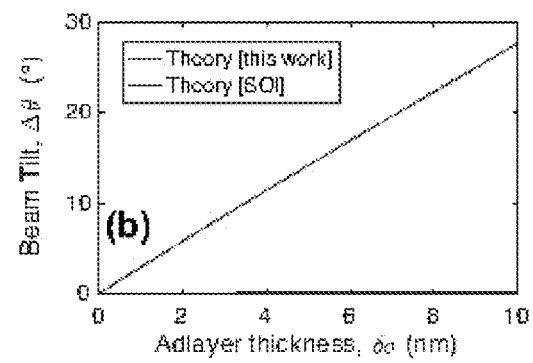
Figure 5C:
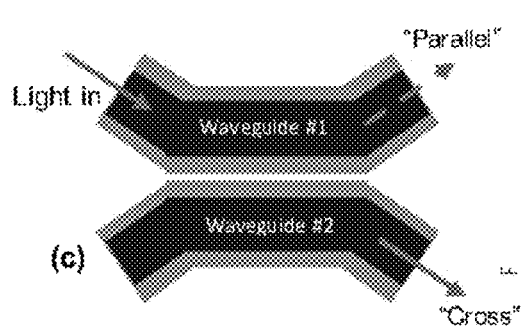
Figure 5D:
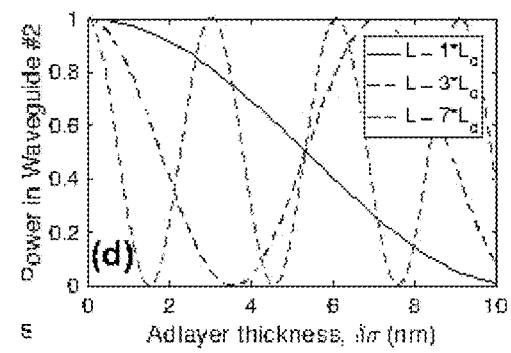

FIGS. 5(a) through (d) relate to presently disclosed examples of passive devices which can enable record surface sensitivity in non-wavelength interrogated (single-wavelength) configurations. More particularly, FIG. 5(a) illustrates an exemplary integrated porous grating coupler, and FIG. 5(b) illustrates its corresponding emission angle sensitivity, while FIG. 5(c) illustrates an integrated porous directional coupler, and FIG. 5(d) illustrates power transfer vs. adlayer thickness for selected coupler lengths. Shaded colors in FIGS. 5(a) and 5(b) indicate porous layers of differing porosity and effective refractive index.

A directional coupler is a classic integrated photonic device, commonly utilized in 50:50 power splitters. In recent years, various efforts have sought to improve the performance of such splitters and couplers, and to improve their fabrication tolerances (reduce sensitivity) through the advanced design of multi-mode interference (MMI) and adiabatic directional couplers. Here, presently disclosed subject matter harnesses the sensitivity of the directional coupler, and amplifies it by orders of magnitude using presently disclosed unity confinement factor rib waveguides to create a coherent optical sensor based on modal interference.

Preliminary calculations of two prototype porous waveguides in close proximity (gap~300 nm) yields a beat length Lc~15 microns. As analyte toxins specifically interact with the porous waveguide's internal surface, the beat length is modulated resulting in a dynamically evolving coupling into the "cross" state of Waveguide #2 (FIGS. 5(c) and 5(d)). Similar to a Mach-Zehnder Interferometer, the slope of this modulation depends strongly on the optical path length which is traversed.

FIG. 5(d) reveals the calculated power in Waveguide #2 for various directional coupler lengths. For a directional coupler length equal to 7 Lc or approximately 100 microns, the light is modulated by 100% from the "cross" state to the "parallel" state for an analyte adlayer of ~1.6 nm (roughly 8% surface coverage for a 20 nm biomarker). Here, presently disclosed subject matter encompasses design skews with varying degrees of sensitivity per presently disclosed subject matter. Owing to the exceptional sensitivity of these devices, the measurement technique will have to be carefully optimized to allow practical sensor operation. Possible solutions to this challenge include real-time monitoring and "fringe counting" or simultaneous interrogation of multiple arrayed devices with different coupler lengths which would enable unique quantification of the adlayer.

Presently disclosed subject matter is expected to yield new record performing designs and improved understanding of passives and resonators constructed from effective media. Moreover, it effectively identifies and addresses key challenges, trade-offs, and existing limitations concerning photonic design optimization with integrated nanomaterials. The advances achieved with the presently discloses subject matter can result in fabrication of low-cost food safety biosensors and water quality applications, and in improved areas of integrated photonic passives, fiber-to-chip coupling, and grating coupler technology.

Realization of porous silica integrated photonics at visible wavelengths yields sensors that can be realized in low-cost all-silicon derived platform as presently disclosed, which is compatible with visible wavelength optical interrogation. Per presently disclosed subject matter, one is enabled for creating integrated photonic biosensors from pure silicon wafers (reducing cost vs. SOI).

Figure 6:
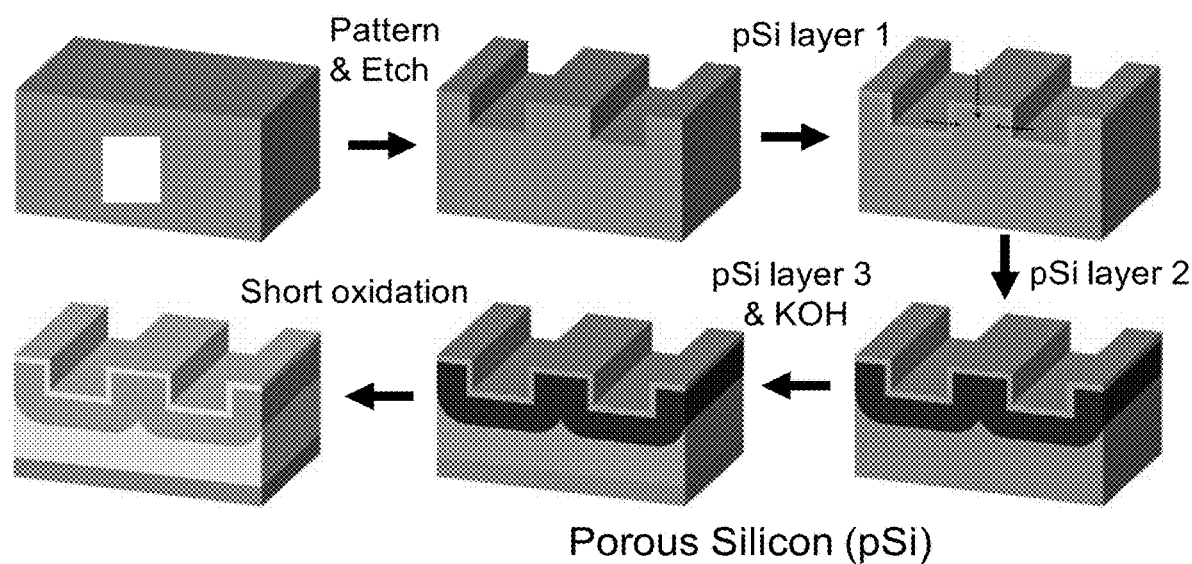
FIG. 6 illustrates multiple steps of a presently disclosed process flow (methodology) for production of presently disclosed exemplary single-mode, unity confinement factor porous silica integrated photonics.

FIG. 6 illustrates a multi-step presently disclosed process flow (methodology) for production of single-mode, unity confinement factor porous silicon and/or silica integrated photonics. FIG. 6 may be thought of as an inverse processing technique for the fabrication of presently disclosed multi-layer pSi rib-waveguides with unity confinement factors.

The presently disclosed process for fabricating porous silica integrated photonic devices as shown in FIG. 6, and referred to as an "inverse fabrication" process, involves a bulk silicon wafer first patterned through standard photolithography and reactive ion etching, then anodized to form the porous silicon layers.

Per the presently disclosed methodology, device fabrication is performed on 4-inch p-type <100> wafers (0.01-0.02 $\Omega$-cm) according to the inverse processing technique shown in FIG. 6. The waveguides described here are patterned to a width ~750 nm and dry etch depth ~550 nm. Wafers are then diced and anodized at the chip-scale in 15% ethanolic hydrofluoric acid (HF). Three layers of pSi are formed during anodization: layers 1 and 3 are etched at 60 mA/cm2 yielding a high porosity ~75%, while layer 2 is etched at 4.9 mA/cm2 yielding a lower porosity ~53%. The refractive index is estimated to be ~2.11 and ~1.41 for the high and low current density layers after all processing steps. A short KOH treatment is then optionally performed to widen the average pore diameter, followed by a short 10-minute oxidation at 600° C. to form a silica surface suitable to surface functionalization.

Such presently disclosed technique offers several key advantages and distinctions versus alternatives.

First, this "inverse fabrication" technique offers cost and compatibility advantages. Notably, the wafer-scale patterning of pre-synthesized porous nanomaterial films presents a number of unique challenges: (1) resists and thermo-plastics may infiltrate the pores, proving difficult to remove, and may contaminate or clog the porous network; (2) chemical treatments and cleaning steps (i.e., developing, plasma descum, etc.) can further adversely affect and corrode highly sensitive porous films; (3) anti-reflection design and use of bottom layer AR coatings (BARC) to optimize critical dimensions (CDs) is significantly more challenging on thin-film multilayers; and (4) etching parallel to the pore orientation introduces undesirable sidewall roughness. By first patterning and etching pure silicon wafers, the presently disclosed proposed process immediately overcomes these challenges and eliminates the cost and complexity of performing wafer-scale processing on pre-anodized multilayer porous silicon wafers. This also overcomes the need to search for alternative low-cost fabrication techniques based on imprinting or metal-assisted chemical etching.

Secondly, this presently disclosed fabrication technique uniquely enables unity confinement factors to be achieved in micron and sub-micron scale single-mode waveguides. This is made possible by first anodizing a thin high current density low index film, "pSi layer 1." Owing to the directional nature of pore formation, this layer conformally wraps the waveguide surface and can be utilized to harvest 100% of the evanescent field (which would otherwise be lost) for sensing. Formation of a higher refractive index core layer, "pSi layer 2," is then performed. The continued directionality of this layer's formation naturally allows a rib-type waveguide to be formed as the etch fronts begin to intersect. Notably, unique modal properties can be achieved by controlling the etch front intersection and resulting refractive index profile, such as single-mode single-polarization waveguiding and exceptional points exhibiting degeneracy of fundamental and first order modes. Lastly, a low index "pSi layer 3" is etched to fabricate a cost-effective cladding layer. Here, this cladding is straightforward to achieve, and for optical biosensing, it offers significant value-to-cost ratio compared to SOI technology. In general, there are two primary embodiments disclosed: (1) the three-layer device noted and described here; and (2) a two-layer device which is effectively a traditional rib-type waveguide—except that is fabricated per the methodology disclosed herewith—with the appropriate design considerations so that the confinement factor in the two-layer rib waveguide can also be approximately unity, thus yielding a high sensitivity device. In this aspect, the presently disclosed two-layer device is potentially also conventional rib-waveguides made from porous silicon, but also different in that the design is carefully tailored to achieve unity confinement factor (for maximum sensitivity) and the fabrication is performed via the presently disclosed inverse processing technique.

With respect to surface chemistry, chemically functionalizing the sensor's surface to specifically interact with the target analyte is of critical importance in the development of an effective surface-based biosensor. Depending on the particular analyte and its properties, an enormous library of potential surface chemistries either already exists or continues to emerge through modern research. For example, for the detection of food- and water-borne small toxins, one may adapt known DNA aptamers. The use of aptamers is especially attractive as it provides high affinity against a multitude of toxins and can readily be tailored to target specific heavy metal ions or small chemical toxins.

Achieving the presently disclosed proposed sensitivity enhancement depends strongly on fully activating the internal surface area of the presently disclosed porous silica optical components. To address particulars, presently disclosed subject matter may be used to carry out a series of measurements in tandem with the presently disclosed aptamer surface functionalization protocol. It is expected that DNA aptamer probes can be efficiently functionalized inside porous silica waveguide surfaces, with careful consideration and control of probe size, pore size, and charge interactions. It is generally expected that the active sensing surface area of a given porous medium depends solely on porous morphology and analyte size distributions, and in non-optimal regimes may be much lower than the theoretical value implied by the specific surface area and average pore size.

The porous morphology of the presently disclosed porous silica embodiments may be characterized using both SEM and physisorption isotherm analysis (PIA) to extract the specific surface area, average pore size, and pore volume. Baseline sensitivity measurements may be obtained by measuring the optical response of the presently disclosed devices to surface chemistry modifications. To conduct such confirmation testing, one may first functionalize the internal surface of the presently disclosed porous silica devices with a well-characterized silane molecule known to form robust monolayers on flat surfaces. As subsequent linker molecules and DNA aptamers are applied, the surface adlayer packing density (or surface mass loading) can be experimentally measured by analyzing the optical response of the presently disclosed sensors. Comparison of the achieved packing density (or surface mass loading) to that observed on flat $SiO_2$ substrates, as characterized by ellipsometry, may then be performed to determine the fraction of active surface area.

By measuring the optical response of the presently disclosed devices, one may observe sensitivity trends which are functions not only of analyte size and average pore dimension, but also functions of porous morphology type (i.e., tubular, interconnected, branchy), pore size standard deviation, and specific surface area. Such results would provide additional insight into porous sensor characteristics, limitations, and design strategies, to optimize presently disclosed surface functionalization for enabling subsequent specific sensing verifications.

With respect to toxin sensing verification, one may evaluate the detection of two types of toxins using the presently disclosed porous silica integrated photonics platform: (1) the heavy metal ion $Hg^{2+}$ in water samples, and (2) aflatoxin M1 in dairy samples.

Mercury is known to rank very highly among heavy metals in terms of both toxicity and carcinogenicity. Adverse effects associated with mercury exposure, i.e., consumption through contaminated water or food sources, includes mercury poisoning related symptoms and elevated cancer risks induced by increased oxidative stress. Presently disclosed subject matter performs mercury detection using a hairpin forming DNA aptamer (5'-TCATGTTTGTTTGTTGGCCCCCCTTCTTTCTTA-3'), previously demonstrated in both labelled and label-free $Hg^{2+}$ detection. Sensor operation exploits specific interactions between the $Hg^{2+}$ analyte and the functionalized surface. Prior to detection, the aptamer probe will be hybridized to a short hairpin blocking complementary sequence (3'-AGTACAAAC-5') prefunctionalized to the silica surface. When exposed to the analyte, the high affinity between $Hg^{2+}$ and thymine bases will cause the ~10 nm length aptamer probe to de-bind from the sensor surface and fold into a ~5 nm hairpin mediated by T-Hg-T complexes. Owing to the thymine base configuration and CCCC folding point, up to seven mercury ions are captured as the aptamer probe disassociates from the surface. This aptasensor is specific to $Hg^{2+}$ and has been previously shown to support excellent ~18:1 selectivity against other metal ions.

This aptasensor design effectively converts the challenge of detecting atomic scale metal ions into measuring the specific debinding of a ~10 nm single stranded DNA surface adlayer. While conventional applications of this aptasensor are fundamentally limited by the probe surface density, the presently disclosed porous silica device will amplify the available surface area by nearly two orders of magnitude. Moreover, compared to whispering gallery sensors with low mode overlap, the presently disclosed device features a maximal mode overlap owing to its unity confinement factor and is predicted to have more than three orders of magnitude higher surface adlayer sensitivity than whispering gallery (WG) resonators. Although the quality factor of the presently disclosed devices will be significantly lower than a WG resonator, presently disclosed technology should achieve comparable and potentially lower LOD than WG resonators—all in a field-capable system which can be interrogated at low costs and with modest spectral resolution.

In particular, assuming a modest probe density ~20%, presently disclosed technology should achieve a repeatable LOD for $Hg^{2+}$ induced aptamer mass debinding better than 5 $pg/mm^2$, which is 15 times lower than the ~75 $pg/mm^2$ recently demonstrated in a whispering gallery aptasensor. The presently disclosed corresponding $Hg^{2+}$ LOD is anticipated to be in the range of ~1-5 nM, which would for the first time in a chip-scale guided wave optical sensor produce a limit of detection below the 2 ppb EPA standard established for drinking water.

It is further expected per the present technology that the response time of the presently disclosed sensor will be very fast owing to the shallow porosity of the presently disclosed waveguide platform, large open area, high diffusivity of $Hg^{2+}$, and strong DNA concentration gradient formed upon aptamer surface desorption into solution. To verify such expectations, one may follow the established aptamer functionalization protocols referenced above and carry out sensing experiments at varied mercury concentrations. One may also validate specificity and measure non-specific effects by exposing the presently disclosed sensors to control metal ions. It is also expected that presently disclosed device responsivity may further improve, for example, with labelling of the aptamers with high refractive index nanoparticles.

Aflatoxin M1 ($AFM_1$) is among the leading toxins/carcinogens synthesized by pathogenic fungi from the genus Aspergillus. $AFM_1$ has been directly linked to hepatocellular carcinoma (liver cancer) and fatal cirrhosis (liver damage), and has further been associated with severe and fatal food poisoning episodes around the world. Aside from its profound ability to contaminate molded crops, $AFM_1$ is especially threatening to the food safety of dairy products owing to its longevity and ability to persist through pasteurization. Adopting recently established aptamer designs for $AFM_1$ detection per presently disclosed technology may functionalize the internal surface of the presently disclosed porous silica sensors.

One may further apply the sensor directly to the detection of $AFM_1$ in milk samples, which presents a complex matrix constituted of butterfat globules, bacteria, and protein complexes. It is further expected that the filtration capabilities of the porous sensor can provide increased robustness and shield devices from non-specific interactions with the sample matrix. For example, the non-specific surface adsorption of proteins, fat globules, and bacteria can destroy the sensing performance of open evanescent sensors (SPR, whispering gallery, conventional integrated photonic), whereas the unity confinement porous silica structure will naturally filter out such larger contaminants and have ~0% mode overlap with the external environment resulting in enhanced specificity and signal-to-noise. Verification of expected non-specific adsorption may be conducted by varying the waveguide design (layer 1 thickness), systematically diluting milk concentration with water and comparing performance to a reference evanescent SOI sensor. Results may suggest regimes of operation compatible with direct field testing, which does not require filtration, separation, or centrifugation.

$AFM_1$ may be obtained and applied at varying concentrations in pasteurized milk and water samples, and analyzed along with control samples from uncontaminated milk and water. Consideration may be practiced for some embodiments to make use of application of a short, 21 mer, aptamer sequence (5'-ACTGCTAGAGATTTTCCACAT-3') which is shorter than most aptamer sequences typically utilized (60-80 mer) for $AFM_1$. The small size of the aptamer is expected to promote improved probe surface density within the porous silica morphology, while further allowing minimization of the average pore diameter—both of which foster improved sensitivity and optical performance (higher achievable effective index and lower scattering). Unlike the $Hg^{2+}$ aptasensor which employs surface adlayer desorption, analyte detection will be performed through surface adlayer adsorption by specifically immobilizing $AFM_1$. The comparison between an associative and dissociative sensor allows further design mapping for adjusting particular embodiments of presently disclosed subject matter.

The following relates in particular to presently disclosed waveguide design and inverse processing technique. Another example of the presently disclosed inverse processing technique is illustrated in FIG. 7(*a*). Silicon wafers are first patterned and etched through electron beam or photolithography followed by reactive ion etching (RIE). This patterning step defines the outer dimensions of our rib waveguides. Anodization is then performed in 15% ethanoic hydrofluoric acid solution. This step can optionally be performed at the wafer-scale or after dicing the pre-patterned silicon substrate into smaller dies. During anodization, the applied current density and duration are precisely controlled to create multiple layers of pSi with controlled average pore dimensions, refractive indices, and layer thicknesses. A similar inverse technique has also been utilized to construct novel micro-optical devices from pSi.

This disclosure relates to both three-layer (3-L) and two-layer (2-L) pSi waveguide designs which utilize a high index, n≈X2.1, pSi core layer cladded by a low index, n≈1.56, pSi layer. In the 3-L design an additional top-cladding pSi layer is etched which harvests all the residual evanescent field and achieves unity confinement factors at smaller core dimensions. FIG. 7(*a*) shows the inverse fabrication procedure showing patterning of Si wafers followed by anodization to create 2-L or 3-L designs, while FIG. 7(*b*) shows spatial design parameters for proposed waveguides showing cross section schematic and SEM image.

FIGS. 8(*a*)-8(*f*) illustrate cross-sectional SEM (scanning electron microscope images) of 3-L devices showing variable widths after completing the presently disclosed inverse processing technique (scale bar=1 μm). In particular, such figures show cross-sectional scanning electron microscopy (SEM) images of 3-L waveguide structures fabricated across a waveguide width skew. These images highlight the unique rib-type geometry that is achieved from the presently disclosed inverse processing technique. As visible, anodization proceeds preferentially in the <100> family of directions (e.g., normal to the (100) planes on the top surfaces and waveguide sidewalls). To achieve a single-mode rib waveguide design, the presently disclosed waveguide geometry and layer thicknesses are selected such that the opposing etch fronts, which define the core layer (originating from the sidewalls), begin to intersect with each other beneath the rib (i.e., FIGS. 2(c)-2(e)). Additional details regarding processing parameters for exemplary embodiments are as follows.

Patterning: Patterning is achieved so that 4-inch (100) p+ silicon wafers (0.01 Ω-cm) are first patterned using electron beam lithography (JEOL 9300FS 100 kV) and reactive ion etching (C4F8-27 sccm, SF6-12 sccm, Ar-2 sccm) to fabricate silicon ribs with widths ranging from 0.3 to 2.5 microns at a dry etch depth of ~650 nm.

Porous Silicon Preparation: Patterned Si wafers are diced into ~3 cm×~3 cm dies and anodized in a 15% ethanoic hydrofluoric acid solution using a 55 mA/cm$^2$ current density for the lower index cladding (nclad 1.56) and 4.92 mA/cm2 current density for the higher index core (ncore≈2.1). For the 2-layer design, the anodization conditions are 4.92 mA/cm$^2$ for 177 seconds and 55 mA/cm$^2$ for 70 seconds. This corresponds to thicknesses of approximately 800 nm for the core (layer 1) and 2050 nm for the cladding (layer 2). For the 3-design the anodization conditions are 55 mA/cm$^2$ for 4.5 seconds, 4.92 mA/cm$^2$ for 118 seconds, then 55 mA/cm$^2$ for 77 seconds. This corresponds to thicknesses of approximately 180 nm, 650 nm, and 2250 nm for the three layers. To facilitate optical testing dies are cleaved using a diamond tipped scribe which creates the waveguide facets. A Keithley DC current source is used for the etch systems. Etched waveguides are placed inside a 500° C. furnace for 5 minutes for oxidation.

Numerical Modeling: Waveguide simulation is performed using a commercial eigenmode solver (Lumerical MODE Solutions). Porous silicon layers are modelled at a wavelength of 1600 nm using a Bruggeman effective medium approximation, assuming a pore diameter of ~15 nm for the core layer and ~35 nm for the cladding layer. Refractive index profiles are modelled as isotropic. We note that a more rigorous approach would ideally implement a spatially varying permittivity tensor to account for the anisotropy and local rotation in the pore orientation.

Optical Measurements: We use a near-IR tunable laser (Santec TSL-510) with wavelength sweep capabilities from 1560-1680 nm with a photodetector (Newport 918D-ROD3R) coupled to a power meter (Newport 2936-R). Interchangeably, an infrared camera (Hamamatsu c2741) is used at the output facet for imaging (FIGS. 10(e) and 10(f)). We also use a polarizer at the output facet to identify and tune into the TE or TM polarization modes using a manual polarization controller. The captured spectrum is analyzed by running a fast Fourier transform where the peak corresponds to the total path length 2 ngL where ng is the group index and L is the length of the Fabry-Perot cavity.

Porous Silicon Refractive Index Measurements: Refractive index corresponding to a specific current density is measured by fitting the reflectance spectra of a pSi thin film, with known thickness (confirmed via SEM), to a transfer matrix model using Bruggeman effective medium theory.

FIGS. 9(a)-9(f) reveal the simulated confinement factors and surface adlayer sensitivities of our 2-L and 3-L waveguide geometries alongside a comparison to the conventional pSi strip waveguide geometry. We observe consistent, approximately unity, transverse confinement factors for both 2-L and 3-L waveguides.

Figures 9A, 9B, 9C, 9D, 9E, 9F:
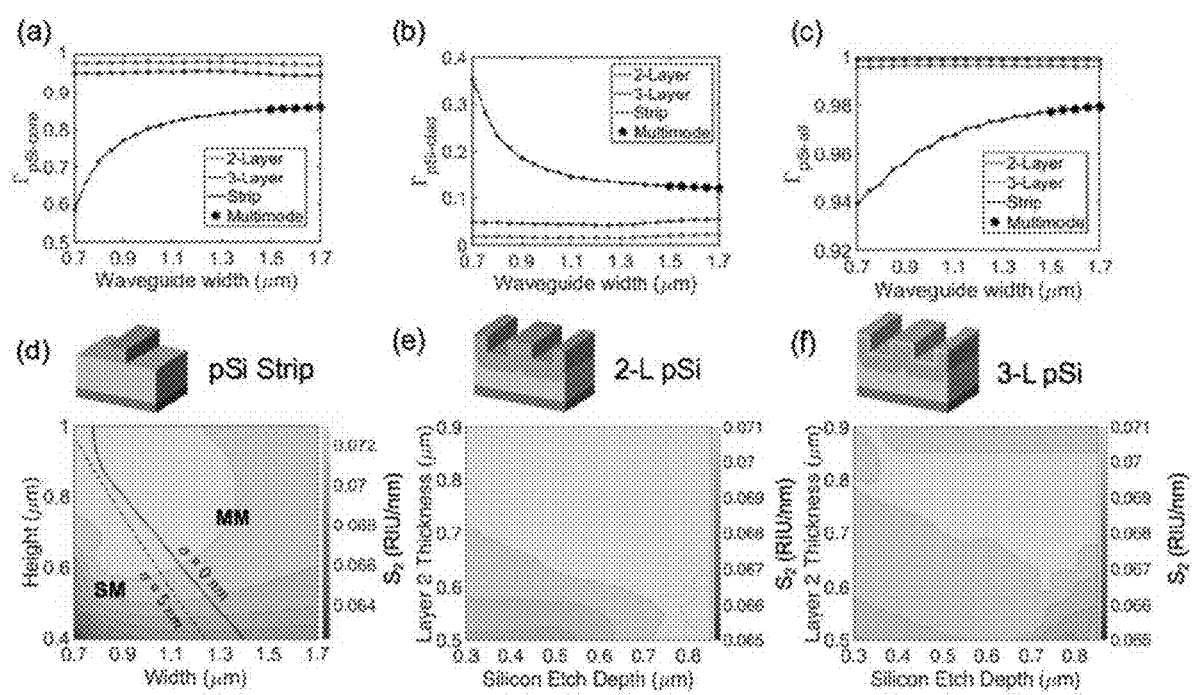
FIG. 9(a) illustrates confinement factor in the core region (high index pSi) vs. waveguide width for our 2-L and 3-L waveguides and a comparison to pSi strip waveguides.
FIG. 9(b) illustrates confinement factor in the cladding region (low index pSi region) vs. waveguide width for 2-layer, 3-L and pSi strip waveguide cladding.
FIG. 9(c) illustrates total confinement factor (pSi) vs. waveguide width.
FIG. 9(d) illustrates pSi strip (σ=attached adlayer thickness)
FIGS. 9(e) and 9(f) illustrate, respectively, 2-layer and 3-L design sensitivity contours (width=1 μm) as a function of waveguide dimensions.

In particular, FIG. 9(a) illustrates confinement factor in the core region (high index pSi) vs. waveguide width for our 2-L and 3-L waveguides and a comparison to pSi strip waveguides. FIG. 9(b) illustrates confinement factor in the cladding region (low index pSi region) vs. waveguide width for 2-layer, 3-L and pSi strip waveguide cladding. FIG. 9(c) illustrates total confinement factor (pSi) vs. waveguide width. FIG. 9(d) illustrates pSi strip (σ=attached adlayer thickness). FIGS. 9(e) and 9(f) illustrate, respectively, 2-layer and 3-L design sensitivity contours (width=1 μm) as a function of waveguide dimensions. For the 3-L design the top cladding is 180 nm and the bottom cladding is 3 μm. Single and multi-mode regimes are defined by the boundary in FIG. 9(d).

The 2-L waveguide exhibits higher fractional confinement in the pSi core layer while the 3-L waveguide harvests all the residual evanescent field for sensing and confines ~5% of the electric field energy in the ~180 nm top thin cladding layer. Unlike the pSi strip waveguide, both the 2-L and 3-L waveguides retain their single mode characteristics throughout all the dimensions spanned in FIGS. 9(a)-(f). The 2-L and 3-L designs further exhibit highly uniform sensitivities which are thus extremely tolerant to fabrication variations. Our calculations show that the pSi strip waveguide geometry can be pushed into an ultra-high confinement factor regime (>90%), while also accounting for the field retained in the pSi cladding (~15%). However, as expected, they become multimode as confinement approaches unity. Compared to the 2-L and 3-L designs, pSi strip waveguides also show lower confinement in the core region. Owing to the smaller pore dimensions of the higher index core layer, it is predicted to exhibit ~50-60% larger index sensitivity, ∂nA/∂σ from Equations herein, than the low index cladding effective medium which has larger average pore diameter (>50 nm). Moreover, since the core index is significantly perturbed during the act of sensing, the single mode (SM) to multi-mode (MM) cut-off is also highly sensitive to the surface bound adlayer thickness, 0 nm and 5 nm, as calculated at a single wavelength (1600 nm).

In a practical implementation of a pSi strip waveguide sensor, it would be desirable to operate away from the optimal sensitivity point to ensure single mode operation across reasonable fabrication variations, sensing corner-cases, and wavelengths of interrogation. The 2-L and 3-L designs meanwhile, guarantee SM operation, as well as maximum and consistent sensitivity across a broad fabrication window and optical bandwidth (>100 nm).

The following relates in pertinent part to presently disclosed unity confinement factor pSi waveguide interferometers.

Figure 7A:
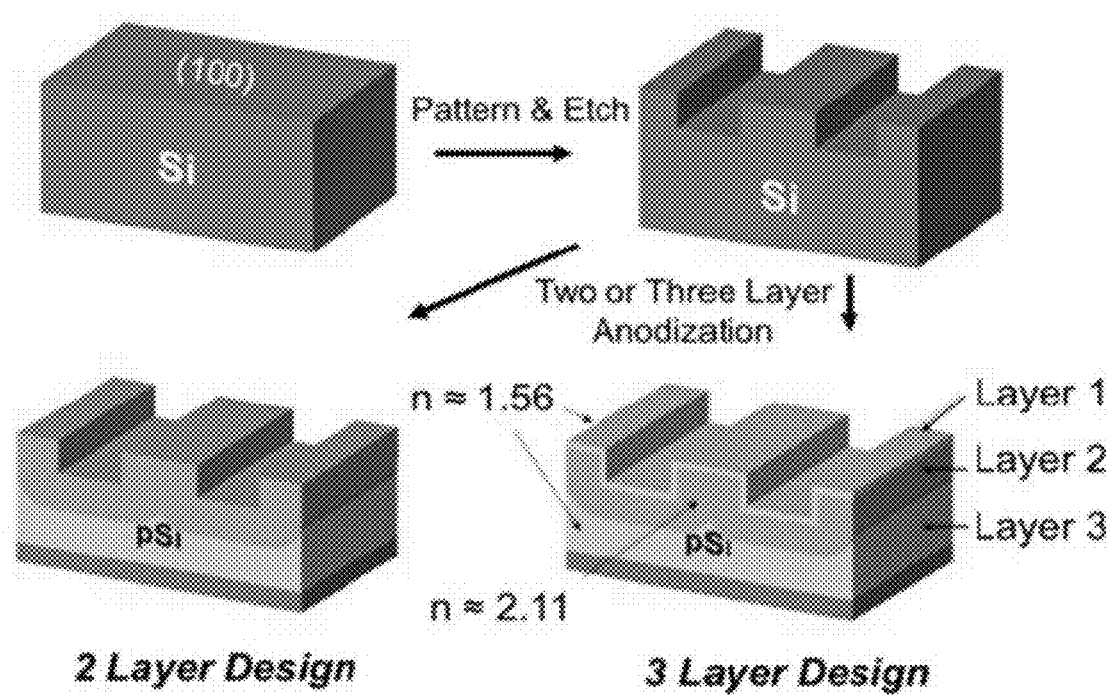
Figure 7B:
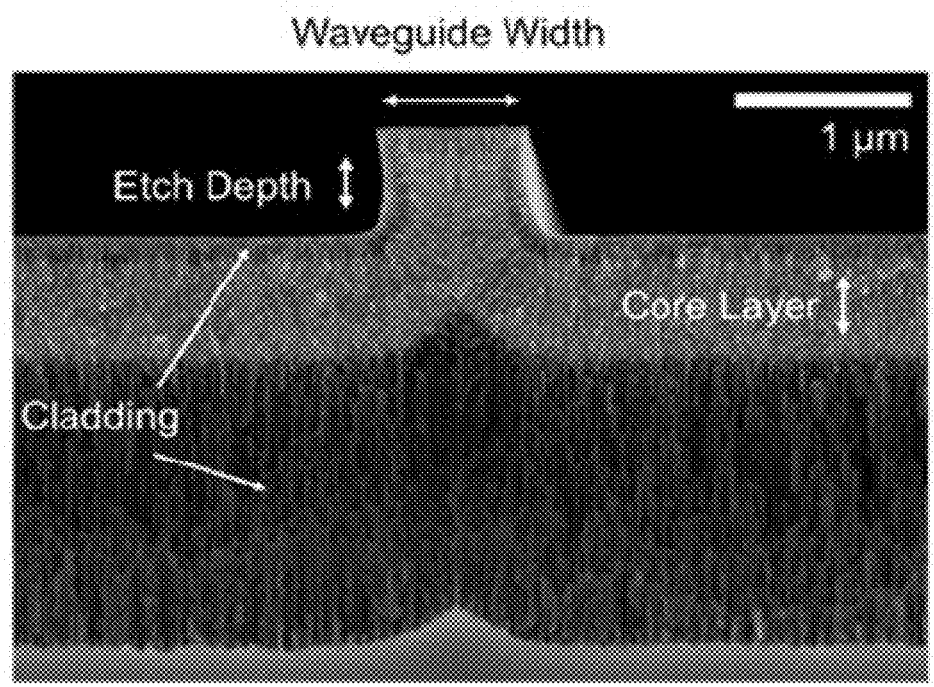
FIG. 7(b) shows spatial design parameters for proposed waveguides showing cross section schematic and SEM image.
Figures 8A, 8B, 8C, 8D, 8E, 8F:
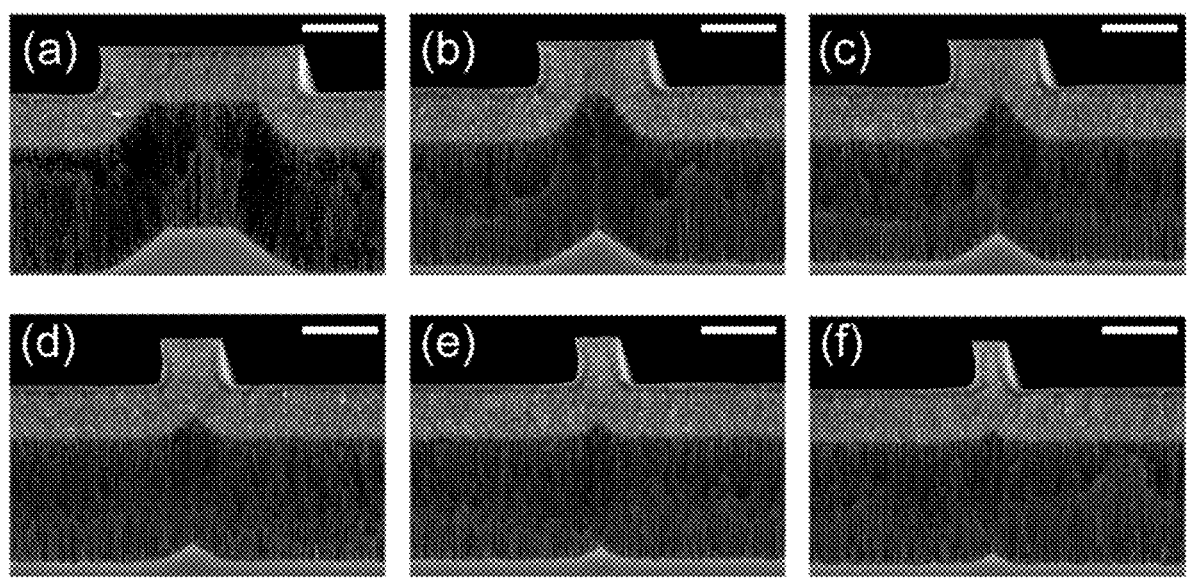
FIGS. 8(a)-8(f) illustrate cross-sectional SEM (scanning electron microscope images) of 3-L devices showing variable widths after completing the presently disclosed inverse processing technique (scale bar=1 μm)
Figures 10A, 10B, 10C, 10D, 10E, 10F:
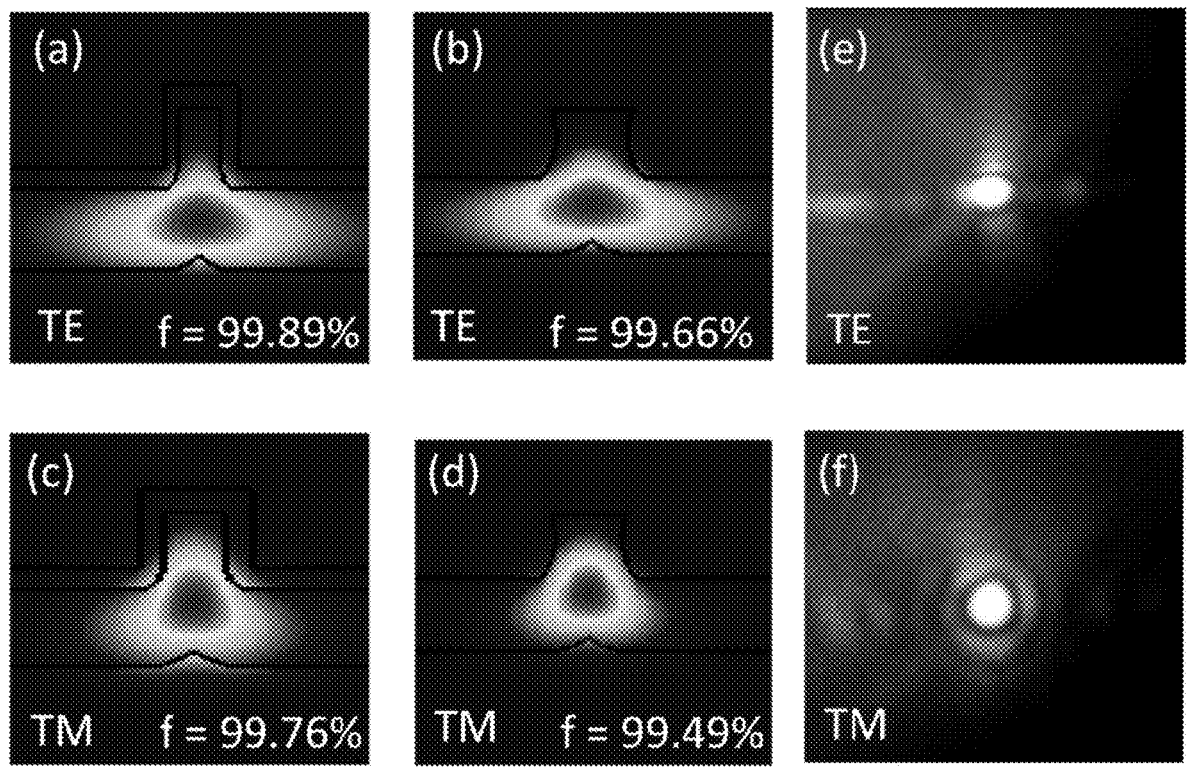
FIGS. 10(a)-(f) illustrate simulation of the 900 nm 2-layer waveguide reproduced from SEM measurements, with FIG. 10(a) showing simulated TE, and TM FIG. 10(c) mode shape and confinement factor for 3-L waveguides; TE FIG. 10(b) and TM FIG. 10(d) mode shape and confinement factor for 2-L waveguides; and TE FIG. 10(e) and TM FIG. 10(f) mode shape captured on IR camera on the 900 nm 2-layer waveguide.

We fabricate 2-L and 3-L waveguides with specific widths that satisfy the geometry where the opposing etch fronts intersect below the core (FIGS. 7(d)-7(f)). Fabrication details are described elsewhere herein. Chosen waveguide dimensions are utilized to simulate our waveguide model. Simulations confirm near unity transverse confinement factors of 99.89% and 99.76% for TE and TM modes respectively in the 3-L waveguide, and 99.66% and 99.49% for TE and TM respectively in the 2-L waveguide (FIG. 10). We capture the TE/TM mode shapes on infrared camera and observe them to be consistent with the simulation (FIGS. 10(e) and 10(f)). We also perturb the position of input coupling fiber and are unable to excite or observe any higher order modes, thus confirming the single-mode nature of these waveguides.

FIG. 10 illustrates simulation of the 900 nm 2-layer waveguide reproduced from SEM measurements showing simulated TE per FIG. 10(a) and TM FIG. 10(c) mode shape and confinement factor for 3-L waveguides, TE FIG. 10(b) and TM FIG. 10(d) mode shape and confinement factor for 2-L waveguides and TE FIG. 10(e) and TM FIG. 10(f) mode shape captured on IR camera on the 900 nm 2-layer waveguide.

FIG. 11 illustrates the experimental measurement setup. In particular, FIG. 11(a) illustrates experimental setup of the Fabry-Perot configuration for testing the waveguides while FIG. 11(b) illustrates spectrum captured from the 1560-1680 nm wavelength sweep, and while FIG. 11(c) illustrates FFT analysis revealing peaks corresponding to the waveguide group index. TE and TM modes are identified using a polarizer.

Transmission measurements are performed with the waveguides in a Fabry-Perot configuration with waveguide length L between the input and the output cleaved facets with reflectivities R1 and R2, respectively. Example transmission data for a 2-layer waveguide is shown in FIG. 11(b). Performing a fast Fourier transform (FFT) on spectra in the frequency domain shows a peak, which corresponds to the value 2 ngL where ng is the group index of the guided mode and L is the length of the cavity. FIG. 11(c) shows the value of the group index (ng) plotted on the same scale for TE and TM modes. For all performed measurements, the TE mode showed a higher group index compared to the TM mode, approximately by 0.15 RIU. This experimentally measured TE/TM index difference is attributed to the anisotropic refractive index of porous silicon, as our simplified waveguide simulation, which approximates the layers with an isotropic refractive index, predicts a difference <0.03 RIU from mode dispersion. We note that the index contrast $\Delta n \approx 0.15$ is comparable to the birefringence noted in other works using porous silicon thin films at ~55% porosity.

In addition to extracting the waveguide's group index, our measurements allow us to approximate the propagation loss from the spectrum's fringe contrast while assuming facet reflectivities (R1=R2≈0.11), which are given by the ideal Fresnel reflection coefficients. We measure the loss from the captured Fabry-Perot fringes (FIG. 11(b)) where the upper bound of the loss is 2.7±0.3 dB/mm, which is in close agreement with recent literature on lightly oxidized mesoporous silicon waveguides. Note: If a given device's facet reflectivities are less than the ideal Fresnel values, i.e., due to an imperfect cleave angle, the measured fringe contrast will be reduced under the same nominal loss leading to overestimation of the waveguide loss. These losses originate from free carrier absorption in the highly doped p-type silicon skeleton and Rayleigh scattering from surface roughness and disorder in the bulk pSi structure. To characterize waveguide sensitivity to surface adlayers, we perform a proof-of-concept demonstration using 3-aminopropyltriethoxysilane (3-PTES), which is a silane molecule commonly utilized for enhancing surface adhesion between silica and organic molecules. Here, the 3-APTES serves as a ~0.8 nm thick model adlayer, with a refractive index near ~1.46. Prior to 3-APTES exposure, waveguides are oxidized for 5 minutes at 500° C.

The oxidization process lowers the effective index of pSi layers owing to the consumption of high index silicon, resulting in a reduction in effective and group indices, whereas the silane attachment increases the effective index of pSi layers and increases the waveguide effective and group indices. After oxidation, we expose the waveguides to 4% 3-APTES, diluted in a $H_2O$: methanol (1:1) mixture for approximately 45 minutes, followed by thorough rinsing in water and drying under air flow. Waveguide transmission spectra are recorded before and after each step, and the group index is measured via the fast Fourier transform (FFT) method. This approach is similar to pSi thin film biosensors where taking the FFT of an optical spectrum produces a single peak which corresponds to the double pass optical path length (2 ngL) of the Fabry-Perot cavity. This approach attractively enables sensing to be performed without tracking a specific spectral feature or resonance shift. We also note that owing to the significantly enhanced ~mm scale path length of our devices, i.e., versus the ~μm path length of pSi thin film devices, the interferometric resolution and limit of detection is correspondingly enhanced. This principle is experimentally supported by the ultra-narrow FFT peaks we are able resolve in the Fourier domain, where the peak 2 nL value normalized to the full width half maximum, $\Delta 2$ nL, is observed to be ~150 in our ~1 mm length interferometers when analyzed over a spectral bandwidth of ~100 nm versus a value 2 nL/$\Delta 2$ nL~5 in typical micro-scale thin-film pSi biosensors, typically analyzed over a ~500 nm bandwidth.

Figures 12A, 12B, 12C, 12D:
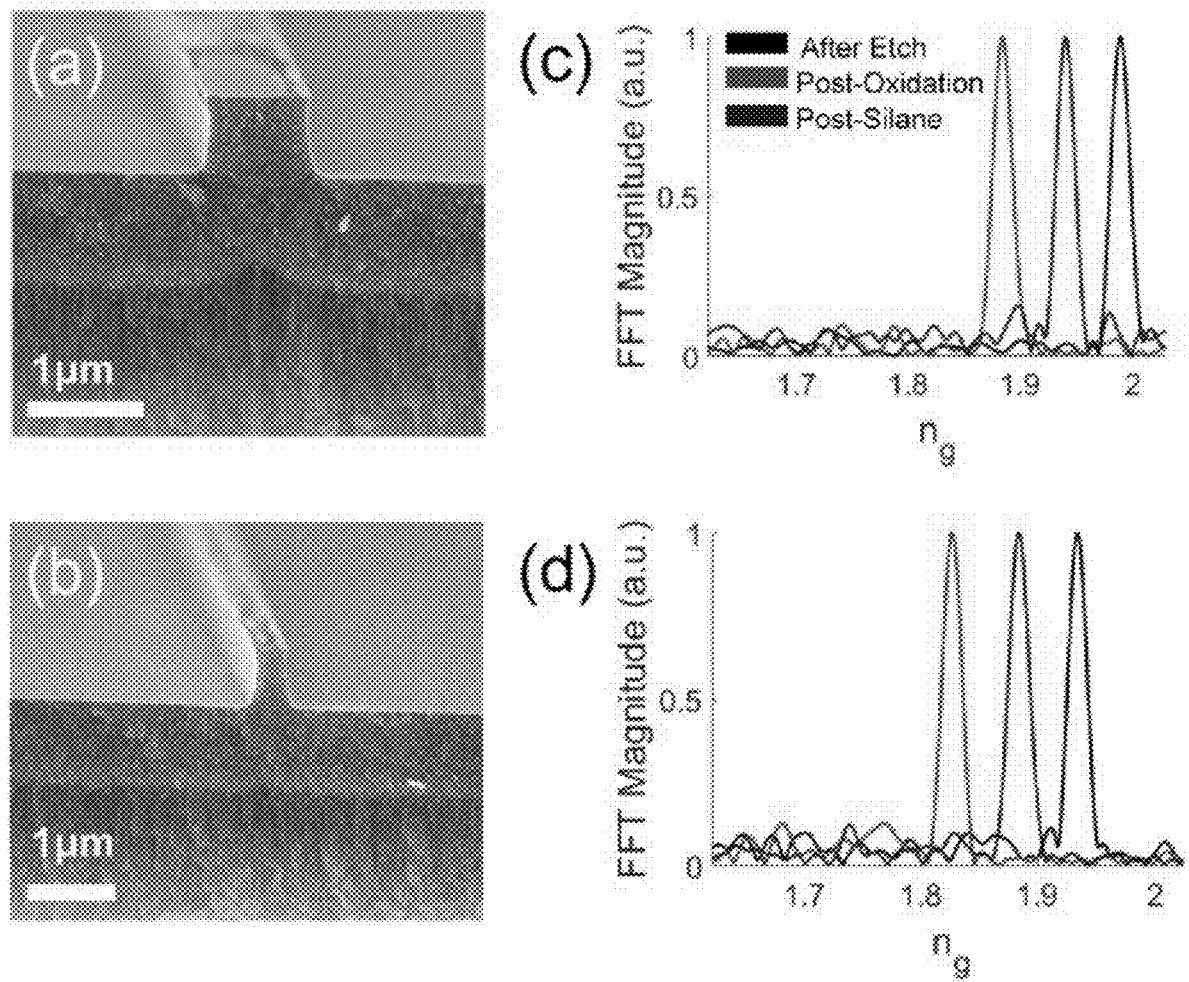

Surface sensing characterization features, with experimental results for wide and narrow 2-L waveguides (900 nm and 500 nm width at the base respectively) are presented in FIG. 12. In particular, FIG. 12(a) illustrates a cross-section SEM of a 2-layer prototype pSi rib waveguide of 900 nm width. FIG. 12(b) illustrates a cross-section SEM of a 2-layer pSi rib waveguide of 500 nm width. FIG. 12(c) illustrates a group index from the FFT of the spectrum for TE mode for the 900 nm waveguide, and FIG. 12(d) illustrates a group index from the FFT of the spectrum for TE mode for the 500 nm waveguide.

Transmission spectra was collected under TE polarization and the sensor response is determined as the observed shift in group index $\Delta$ng. Per expectation, the wider waveguide shown in FIG. 12(a) shows a higher nominal group index.

After oxidation and silanization, we observe a clear shift in group index between each measurement. As summarized in Table 1 herein, the index reduction due to oxidation in the 2-layer waveguides is approximately $\Delta$ng≈0.105, and the observed index increase due to 3-APTES attachment is approximately $\Delta$ng≈0.058. Considering the ~0.8 nm nominal 3-APTES adlayer thickness, the response to silane attachment corresponds to a measured small molecule surface adlayer sensitivity of $\partial n/\partial \sigma \approx 0.0725$ RIU/nm. This result is in good agreement with the predicted effective index sensitivity $S_2$ (~0.07 RIU/nm, FIG. 9(e)).

We also observe a consistent response $\Delta$ng for both narrow and wide waveguides, matched within ~3%, despite their substantial 400 nm width difference. This affirms the repeatability of the sensing process and confirms our expectation (FIG. 9) that the sensitivity in our devices is not a strong function of waveguide dimensions. This experimentally observed tolerance to critical dimensions is significantly improved versus SOI waveguides, which have been shown to exhibit both a lower sensitivity and higher variation in sensitivity with respect to waveguide width, i.e., ~20% sensitivity variation for 150 nm width variation.

Figure 13A:
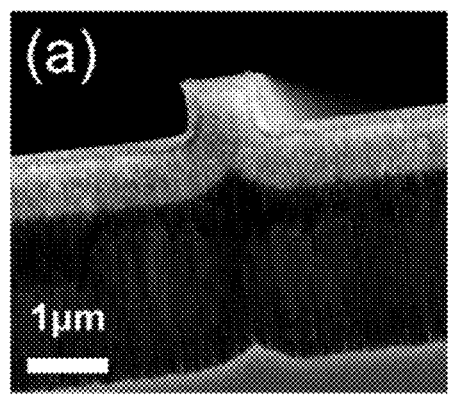
Figure 13B:
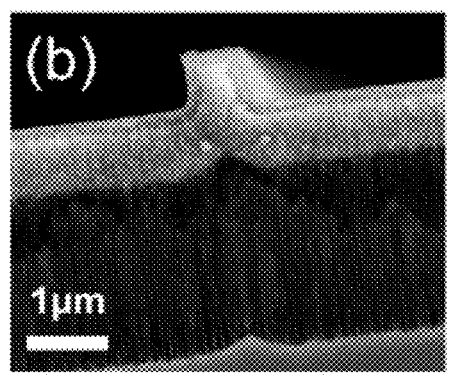
FIG. 13(b) illustrates the cross-section SEM of a 3-L pSi rib waveguide of 600 nm width.
Figure 13C:
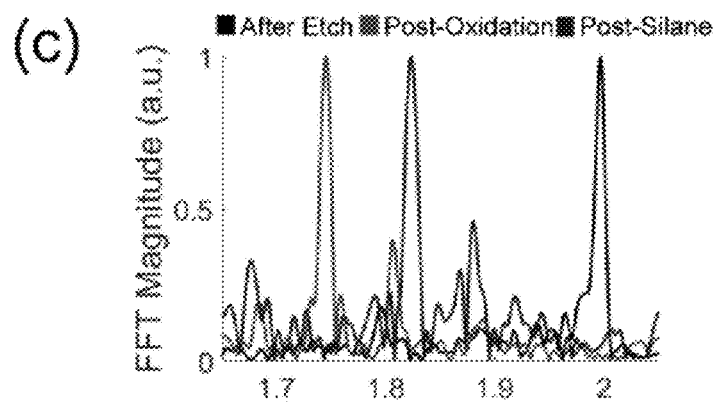
Figure 13D:
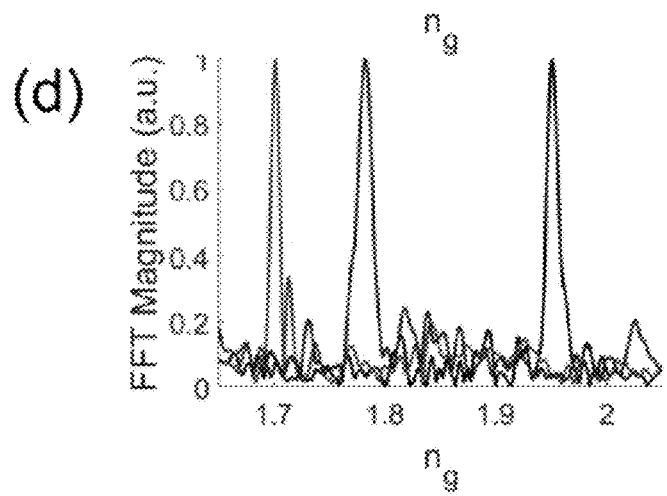
FIG. 13(d) illustrates group index measured from FFT of the spectra for 600 nm waveguide.

We further experiment with the 3-L designs, which have an additional low index high porosity layer of ~180 nm thickness. FIG. 13 shows the 3-L waveguides and measured results for the same experiment detailed above. In particular, FIG. 13(a) illustrates the cross-section SEM of a 3-L pSi rib waveguide of 700 nm width, and FIG. 13(b) illustrates the cross-section SEM of a 3-L pSi rib waveguide of 600 nm width. FIG. 13(c) illustrates group index measured from FFT of the spectra for 700 nm waveguide, while FIG. 13(d) illustrates group index measured from FFT of the spectra for 600 nm waveguide. The blue shift due to oxidation is ~130% larger than the 2-L waveguides, with a measured index reduction $\Delta$ng≈0.25. Here the larger response to oxidation is attributable in part to the increased confinement in the low porosity pSi cladding layers, ~5% in the 3-L waveguide vs. ~2% in the 2-L waveguide. From an effective medium standpoint, higher porosity pSi layers are more sensitive to nanoscale consumption of the Si skeleton. Notably however, the 3-L waveguide also shows an unexpectedly enhanced response to small molecule attachment. The measured group index increases by $\Delta n_g \approx 0.078$ in response to silanization which corresponds to a measured index sensitivity $\partial n/\partial \sigma \approx 0.0975$ RIU/nm, which is ~40% larger than both the 2-L waveguide and the predicted bulk pSi effective index sensitivity $S_2$ (0.07 RIU/nm). We also observe this enhanced sensitivity to be consistent for different waveguide widths. Remarkably, this sensitivity exceeds the effective medium sensitivity of the bulk porous silicon core medium, which is modelled to be ~0.074 RIU/nm for a 15 nm average pore diameter and ~55% bulk porosity.

Exceeding the Sensitivity of Bulk pSi: The Dispersion Degree of Freedom: Here, we posit that the dominant effect producing the observed group index sensitivity enhancement is what we refer to as "sensitivity dispersion." Our predicted waveguide sensitivity (FIG. 9) is modelled as a perturbation in the waveguide effective index $\partial n_{eff}/\partial \sigma$. Unlike the measurement of a spectral resonance shift, our interferometer measurement extracts information related to the group index $n_g$ and its perturbation $\partial n_g/\partial \sigma$ which are given by:

$$n_g = n_{eff} - \lambda \left(\frac{\partial n_{eff}}{\partial \lambda}\right) \quad (4)$$

$$\frac{\partial n_g}{\partial \sigma} = \frac{\partial n_{eff}}{\partial \sigma} - \frac{\partial}{\partial \sigma}\left(\frac{\partial n_{eff}}{\partial \lambda}\right)\lambda \quad (5)$$

Combining Eq. (5) with equations from above, we can re-express the group index sensitivity in terms of the effective index sensitivity $S_2$:

$$S_3 \equiv \frac{\partial n_g}{\partial \sigma} = S_2 - \lambda \frac{\partial S_2}{\partial \lambda} \quad (6)$$

Therefore, the perturbation of group index is equal to that of the effective index $\partial n_{eff}/\partial \sigma = \partial n_g/\partial \sigma$ only if dispersion is constant throughout the experiment, i.e., $\frac{\partial}{\partial \sigma}(\partial n_{eff}/\partial \lambda)\lambda = 0$, or equivalently if the phase sensitivity, as defined herein, is constant versus wavelength such that $$\frac{\partial S_2}{\partial \lambda} = 0.$$

The observed outperformance of our 3-L sensor with respect to the starting model suggests that this contribution becomes non-negligible and suggests that $S_2$ is larger at shorter wavelengths.

The introduction of isotropic or anisotropic thin cladding layers and modifications in the evanescent region of guided modes is known to play a key role in tailoring confinement and hence dispersion. Here, our data suggests the 3-L sensor achieves a favorable sensitivity dispersion. Notably, this effect is not likely to appear in conventional evanescent sensors which would exhibit a decaying confinement factor in the active sensing region at shorter wavelengths and because modal dispersion is dominated by the arrangement of the bulk materials. In the 3-L device however, the core and top cladding material properties are changing significantly in response to surface adlayer attachment, $\Delta n \sim 0.05$, and with a differential sensitivity owing to the different mean porosity and pore sizes in each layer.

Mode calculations of 3-L devices with differential index changes in the core and cladding layers confirm that the group index can undergo a larger change than the effective index. Future work may explore the limits of this effect while factoring in the influence of material dispersion and anisotropy. Assuming sensitivity dispersion as the dominant source of discrepancy between the starting model and experiment suggests that the 3-L waveguide dispersion is modified by as much as $$\frac{\delta}{\delta\sigma}\left(\frac{dn_{eff}}{d\lambda}\right) = 1.5610^{-5} \frac{RIU}{nm} nm^{-1}$$

at $\lambda = 1600$ nm. This observation suggests that device sensitivity may be further enhanced in the future by specifically engineering the effective medium design and waveguide dispersion. This highlights another unique capability of on-chip optics, and sub-wavelength engineered devices and metamaterials, which is not possible in conventional bulk Fabry-Perot interferometers, but is specifically enabled by our high confinement factor multilayer porous waveguide design and fabrication process.

The measured group index shifts from the sensing experiments are summarized in Table 1.

TABLE 1

Summary of measured changes in group index ($\Delta n_g$) from oxidation and silane attachment.

| Waveguide Type | Width | $\Delta n_g$(ox) | $\Delta n_g$(silane) | $\Delta n_g$(ox)/$n_g$ | $\Delta n_g$(sil)/$n_g$(ox) |
|---|---|---|---|---|---|
| 2-L | 900 nm | 0.105 | 0.057 | 0.052 | 0.030 |
|  | 500 nm | 0.109 | 0.059 | 0.056 | 0.032 |
| 3-L | 700 nm | 0.249 | 0.082 | 0.127 | 0.048 |
|  | 600 nm | 0.252 | 0.078 | 0.126 | 0.044 |

Figure 14:
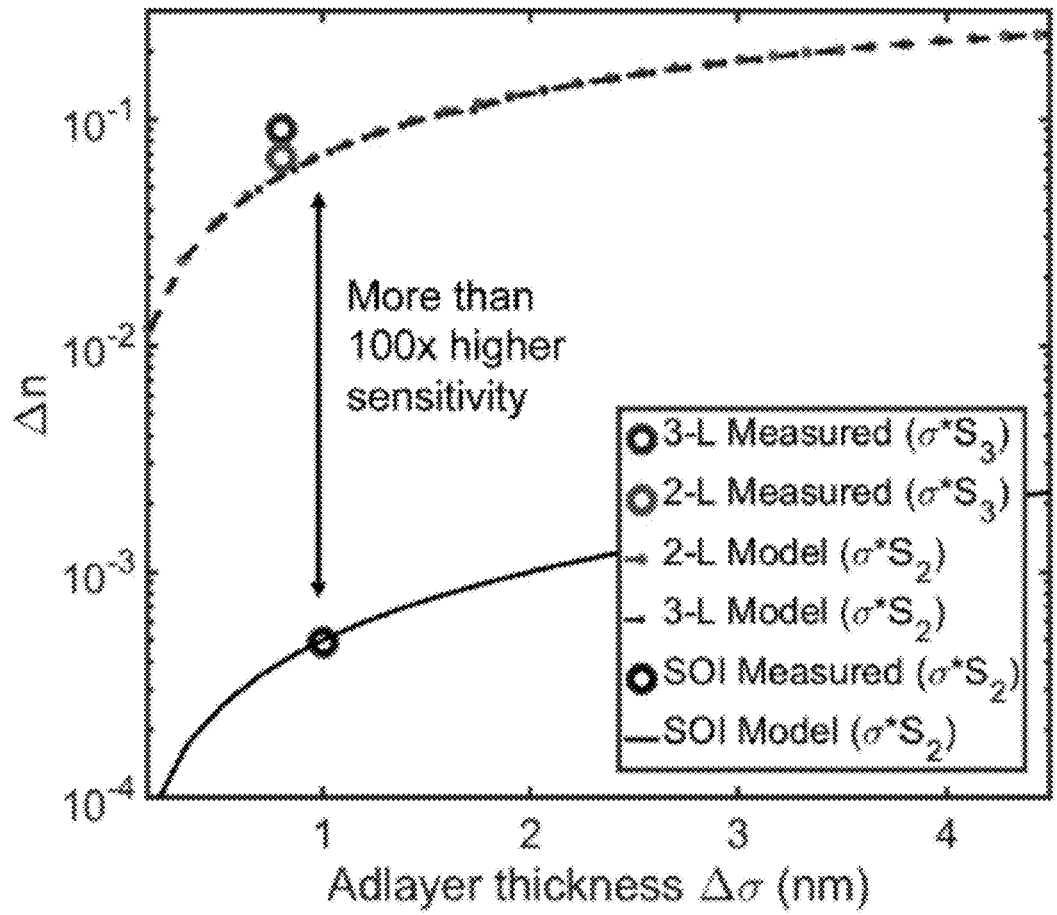
FIG. 14 illustrates theoretical and experimental data of waveguide effective (group) index change σ $S_2$ ($S_3$) vs. adlayer thickness of 2-L and 3-L pSi waveguides and optimized SOI waveguides.

FIG. 14 shows the modeled refractive index change and measured group index change, respectively, for both 2-L and 3-L waveguides compared side by side to modeled and measured effective index change of SOI waveguides to varying small molecule adlayer attachments. More than 100× higher sensitivity is observed in both modeled and measured 2-L and 3-L waveguides compared to evanescent SOI sensors.

More particularly, FIG. 14 illustrates theoretical and experimental data of waveguide effective (group) index change $\sigma$ $S_2$ ($S_3$) vs. adlayer thickness of 2-L and 3-L pSi waveguides and optimized SOI waveguides.

The presently disclosed subject matter demonstrates the design and fabrication of a unity confinement factor surface adlayer biosensor, which displays a surface sensitivity two orders of magnitude greater than evanescent SOI waveguide sensors. The subject design displays an attractive single mode characteristic where the sensitivity is consistent regardless of the spatial design parameters owing to the confinement factor being saturated near unity. We also demonstrated an inverse processing technique wherein bulk silicon is pre-patterned before anodization as a simple and scalable route for realizing porous silicon photonics. Lastly, in our investigation of waveguide interferometers operating in the unity confinement factor regime, we identify dispersion as a promising new degree of freedom for achieving future sensitivity enhancements.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A high sensitivity optical sensor operating on interferometric resolution, comprising:
    an optical waveguide having at least a first porous medium, and a second porous medium with lower refractive index than the first porous medium;
    wherein the first porous medium serves as both a high index waveguide core and as a primary active sensing medium,
    the second porous medium serves as a cladding, and
    the waveguide cross-section comprises a waveguide rib or a waveguide pillar structured in at least two transverse dimensions, so that light propagates longitudinally in a direction orthogonal to the transverse plane of the waveguide; and
    wherein the transverse design of the waveguide achieves a confinement factor of greater than 80% within the first porous medium.

2. A sensor as in claim 1, wherein:
    said waveguide comprises a nanomaterial; and
    said first porous medium comprises porous nanomaterials.

3. A sensor as in claim 2, wherein said porous nanomaterials comprise at least one of porous silicon (pSi), porous silica (pSiO$_2$), porous alumina (pAl$_2$O$_3$), porous titania, and nanoporous gold (npAu).

4. A sensor as in claim 2, wherein said waveguide comprises a pre-patterned shape comprising one of a micro or nanostructure shape.

5. A sensor as in claim 4, wherein:
    said waveguide comprises a bulk silicon wafer; and
    said first porous medium comprises a first layer of an anodized thin high current density low index porous silica film conformally wrapped to the waveguide active sensing surface for harvesting 100% of the evanescent field;
    said second porous medium comprises a second layer of a higher refractive index layer of porous silica or porous silicon and
    said sensor further comprises a third layer of a low index layer of porous silica for optical biosensing such that said sensor comprises an integrated photonic device.

6. A sensor as in claim 5, wherein said first and third layers have of a relatively high porosity of about 75% and said second layer has a relatively lower porosity of above about 50%.

7. A sensor as in claim 1, wherein said first and second porous media comprise porous silicon having a tunable porosity with controlled average pore diameters in a range from less than 10 nm to over 100 nm.

8. A sensor as in claim 1, wherein said active sensing medium has a resulting surface area of at least about 100 m$^2$/cm$^3$.

9. A sensor as in claim 1, wherein said first and second porous media have tunable properties, including tunable average pore diameter, interpore spacing, and porosity.

10. A sensor as in claim 1, wherein at least one of said first and second porous media comprise anodized porous silicon resulting in a porous nanomaterial multilayer waveguide geometry optically capable of achieving an over 90% confinement factor while maintaining single-mode character.

11. A sensor as in claim 1, wherein said first and second porous media comprise porous silicon having tunable porosity in a range from 35% to 80% and which produce a refractive index ranging from 2.6 to 1.3 at optical wavelengths.

12. A sensor as in claim 1, wherein said waveguide comprises a plurality of waveguide ribs having respective widths of about 750 nm and respective depths of about 500 to 550 nm.

13. A sensor as in claim 1, wherein at the optical waveguide has an operating wavelength and polarization such that the waveguide supports only a single waveguide mode.

14. A sensor as in claim 13, wherein the transverse design of the waveguide achieves a confinement factor of greater than 95% across all the porous media comprising the waveguide.

15. A sensor as in claim 13, wherein the transverse design of the waveguide achieves a confinement factor in a range of 20% to 80% across the second porous medium.

* * * * *